US012612541B2

(12) United States Patent
Allgood et al.

(10) Patent No.: US 12,612,541 B2
(45) Date of Patent: Apr. 28, 2026

---

(54) REFRIGERANT BLENDS HAVING LOW GLOBAL WARMING POTENTIAL

(71) Applicant: THE CHEMOURS COMPANY FC, LLC, Wilmington, DE (US)

(72) Inventors: Charles Clinton Allgood, Elkton, MD (US); Barbara Haviland Minor, Elkton, MD (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 1036 days.

(21) Appl. No.: 17/253,016

(22) PCT Filed: Jun. 25, 2019

(86) PCT No.: PCT/US2019/038936
§ 371 (c)(1),
(2) Date: Dec. 16, 2020

(87) PCT Pub. No.: WO2020/005911
PCT Pub. Date: Jan. 2, 2020

(65) Prior Publication Data
US 2021/0122962 A1      Apr. 29, 2021

Related U.S. Application Data

(60) Provisional application No. 62/691,490, filed on Jun. 28, 2018.

(51) Int. Cl.
*C09K 5/04*          (2006.01)
*F25B 45/00*         (2006.01)

(52) U.S. Cl.
CPC .............. *C09K 5/045* (2013.01); *F25B 45/00* (2013.01); *C09K 2205/122* (2013.01); *C09K 2205/126* (2013.01); *C09K 2205/22* (2013.01)

(58) Field of Classification Search
CPC .................................................... C09K 5/045
See application file for complete search history.

(56) References Cited

U.S. PATENT DOCUMENTS

| | | | | | |
|---|---|---|---|---|---|
| 3,564,863 | A | * | 2/1971 | Sasselli | F25B 43/003 |
| | | | | | 210/167.04 |
| 4,364,236 | A | * | 12/1982 | Lower | F25B 45/00 |
| | | | | | 62/84 |
| 4,856,289 | A | † | 8/1989 | Lofland | |
| 4,862,699 | A | † | 9/1989 | Lounis | |
| 4,903,499 | A | † | 2/1990 | Merritt | |
| 4,909,042 | A | † | 3/1990 | Proctor | |
| 5,050,388 | A | † | 9/1991 | Packo | |
| 5,168,721 | A | * | 12/1992 | Hancock | F25B 45/00 |
| | | | | | 62/77 |
| 8,205,462 | B1 | | 6/2012 | Zugibe | |
| 8,544,287 | B1 | | 10/2013 | Kugibe | |
| 8,695,364 | B1 | | 4/2014 | Zugibe | |
| 9,519,891 | B1 | | 12/2016 | Zugibe | |
| 10,713,628 | B1 | | 7/2020 | Zugibe | |
| 10,926,215 | B2 | | 2/2021 | Low et al. | |
| 11,007,471 | B2 | | 5/2021 | Sharratt et al. | |
| 2007/0108403 | A1 | | 5/2007 | Sievert et al. | |
| 2007/0284555 | A1 | | 12/2007 | Leck et al. | |
| 2008/0230738 | A1 | | 9/2008 | Minor et al. | |
| 2009/0090885 | A1 | | 4/2009 | Mueller et al. | |
| 2010/0122545 | A1 | * | 5/2010 | Minor | C09K 3/30 |
| | | | | | 252/68 |
| 2016/0060192 | A1 | | 3/2016 | Sharratt et al. | |
| 2016/0130490 | A1 | | 5/2016 | Kujak et al. | |
| 2017/0013049 | A1 | | 1/2017 | Patil | |

FOREIGN PATENT DOCUMENTS

| | | | |
|---|---|---|---|
| CN | 101827912 | | 9/2010 |
| CN | 102911640 | A | 3/2016 |
| JP | 2004-035436 | | 2/2004 |
| JP | 2012140629 | A | 7/2012 |
| WO | 2004105971 | A1 | 12/2004 |
| WO | 200706044 | A1 | 1/2007 |
| WO | 2007105425 | A1 | 9/2007 |
| WO | 2017/027716 | A1 | 2/2017 |
| WO | 2017131095 | A1 | 8/2017 |
| WO | 2019111877 | A1 | 6/2019 |
| WO | 2020003509 | A1 | 1/2020 |
| WO | WO 2020185558 | † | 9/2020 |
| WO | 2021048949 | A1 | 3/2021 |

OTHER PUBLICATIONS

Parker, Material Information Sheet for Catch-All Brand Filter-Drier Cores. (Year: 2009).*
BR Search Report and Written Opinion in Brazilian Appln. No. BR112020023486-9, dated Nov. 10, 2022, 4 pages.
Office Action in Chinese Appln. No. 201980043884.X, dated Dec. 5, 2022, 13 pages (with English Translation).
Office Action in European Appln. No. 19737447.3, dated Nov. 14, 2022, 6 pages.
PCT International Search Report and Written Opinion for PCT/US2019/038936 mailed Sep. 10, 2019.
The Scientific Assessment of Ozone Depletion: 2002, World Meteorological Organization Global Ozone Research and Monitoring Project—Report No. 47, Controlled Substances and Other Source Gases, Chapter 1, Section 1.4.4 Ozone Depletion Potential, pp. 1.28-1.31, World Meteorological Organization, Geneva, Switzerland.
AHRI Standard 700-2016 Standard for Specifications for Refrigerants, 2016, pp. 1-24, Arlington, VA.
AHRI Standard 700-2017 with Addendum 1, Standard for Specifications for Refrigerants, 2017, Arlington, VA.
Office Action in Chinese Appln. No. 201980043884.X, dated Sep. 28, 2021, 24 pages (with English translation).

(Continued)

*Primary Examiner* — Peter F Godenschwager

(57) ABSTRACT

The present invention relates to processes for preparing refrigerant blends comprising one or more purified hydrofluorocarbon compounds, wherein the one or more hydrofluorocarbon compounds have been recovered from one or more refrigeration, air conditioning or heat pump systems, and purified.

10 Claims, No Drawings

(56) References Cited

OTHER PUBLICATIONS

Office Action in Japanese Application No. 2020-572408, dated Mar. 28, 2023, 8 pages (with English Translation).

Hamlin, Analysis of Equipment and Practices in the Reclamation Industry, Oct. 29, 2010, pages vii-46.

PCT International Preliminary Report on Patentability, dated Jan. 7, 2021, 7 pages.

Hamlin, "Analysis of Equipment and Practices in the Reclamation Industry," U.S. Environmental Protection Agency, Oct. 29, 2010, 52 pages.

Office Action in Australian Appln No. 2019294496, dated Apr. 26, 2024, 4 pages.

Office Action in Canadian Appln. No. 3097913, dated Feb. 26, 2024, 4 pages.

Office Action in European Appln. No. 19737447.3, dated Nov. 17, 2023, 4 pages.

Office Action in Japanese Appln. No. 2020-572408, dated Aug. 29, 2023, 6 pages (with English Translation).

Office Action in Japanese Appln. No. 2020-572408, dated Mar. 4, 2024, 6 pages (with English Translation).

Office Action in Korean Appln. No. 10-2021-7002385, dated Mar. 11, 2024, 12 pages (with English Translation).

Communication Pursuant to Article 94(3) EPC in European Appln. No. 19737447.3, dated Jul. 10, 2024, 4 pages.

Notice of Acceptance in Australian Appln. No. 2019294496, mailed on Apr. 7, 2025, 4 pages.

Office Action in Australian Appln No. 2019294496, dated Mar. 3, 2025, 5 pages.

Office Action in Canadian Appln. No. 3097913, mailed on May 5, 2025, 5 pages.

Office Action in European Appln. No. 19737447.3, mailed on Mar. 14, 2025, 4 pages.

Office Action in Japanese Appln. No. 2023-221054, mailed on Mar. 11, 2025, 6 pages (with English translation).

Office Action in Korean Appln. No. 10-2021-7002385, dated Dec. 23, 2024, 12 pages (with English Translation).

Office Action in Mexican Appln. No. MX/a/2020/012830, mailed on Dec. 6, 2024, 8 pages.

* cited by examiner

† cited by third party

REFRIGERANT BLENDS HAVING LOW GLOBAL WARMING POTENTIAL

CROSS-REFERENCE TO RELATED APPLICATIONS

This application represents a national filing under 35 U.S.C. 371 of International Application No. PCT/US2019/038936 filed Jun. 25, 2019, and claims the benefit of U.S. Provisional Application Ser. No. 62/691,490, filed Jun. 28, 2018, the disclosure of which is incorporated herein by reference in its entirety.

TECHNICAL FIELD

This invention relates to processes for preparing refrigerant blends comprising one or more purified hydrofluorocarbon compounds, wherein the one or more hydrofluorocarbon compounds have been recovered from one or more refrigeration systems, and purified.

BACKGROUND

Many industries have been working for the past few decades to find replacements for the ozone depleting chlorofluorocarbons (CFCs) and hydrochlorofluorocarbons (HCFCs). The CFCs and HCFCs have been employed in a wide range of applications, including their use as aerosol propellants, refrigerants, cleaning agents, expansion agents for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents. In the search for replacements for these versatile compounds, many industries have turned to the use of hydrofluorocarbons (HFCs) and/or hydrofluoroolefins (HFOs). HFOs, having low ozone depletion potential and low global warming potentials, are regarded as candidates for replacing saturated CFCs and can be employed in a wide range of applications, including their use as refrigerants.

SUMMARY

The present application provides, inter alia, a process of preparing a refrigerant blend comprising one or more recovered hydrofluorocarbon compounds, comprising:

(a) recovering the one or more hydrofluorocarbons from one or more refrigeration, air conditioning or heat pump systems;

(b) purifying the one or more hydrofluorocarbon compounds to form one or more purified hydrofluorocarbon compounds; and (c) blending the one or more purified hydrofluorocarbon compounds with one or more hydrofluoroolefins having a global warming potential of less than about 20 to form the refrigerant blend;

wherein the one or more hydrofluorocarbon compounds are selected from difluoromethane (R-32), pentafluoroethane (R-125), 1,1,1,2-tetrafluoroethane (R-134a), 1,1-difluoroethane (HFC-152a), 1,1,2,2-tetrafluoroethane (HFC-134), and 1,1,1,2,3,3,3-heptafluoropropane (HFC-227ea), or any mixture thereof.

The present application further provides a process of reducing the global warming potential of a refrigerant blend, comprising:

(a) selecting one or more hydrofluorocarbons recovered from one or more refrigeration, air conditioning, or heat pump systems;

(b) purifying the one or more hydrofluorocarbon compounds to form one or more purified hydrofluorocarbon compounds; and (c) blending the one or more purified hydrofluorocarbon compounds with one or more hydrofluoroolefins having a global warming potential of less than about 20 to form a purified refrigerant blend;

wherein the purified refrigerant blend has a reduced global warming potential compared to a refrigerant blend comprising the one or more hydrofluoroolefins and one or more hydrofluorocarbon compounds which have not been recovered and purified according to steps (b)-(c);

wherein the one or more hydrofluorocarbon compounds are selected from difluoromethane (R-32), pentafluoroethane (R-125), 1,1,1,2-tetrafluoroethane (R-134a), 1,1-difluoroethane (HFC-152a), 1,1,2,2-tetrafluoroethane (HFC-134), and 1,1,1,2,3,3,3-heptafluoropropane (HFC-227ea), or any mixture thereof.

The present application further provides a refrigeration, air conditioning or heat pump system, comprising a refrigerant blend prepared according to a process described herein.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

DETAILED DESCRIPTION

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100-year time horizon is commonly the value referenced.

Because GWP is a measure of how much energy the emissions of 1 ton of a gas will absorb over a given period of time, a compound (e.g., a hydrofluorocarbon or a hydrofluoroolefin) which is recovered from use in an apparatus or a system and subsequently recycled and/or purified will contribute a minimal or even zero "effective GWP" compared to the compound as newly manufactured for use in making a refrigerant mixture or blend. For clarity, recovery is meant to describe a process of removing a refrigerant from a refrigeration, air conditioning or heat pump system after use in that system for some period of time. Reclamation is intended to mean the cleaning/purification of a compound or blend that has been recovered, and includes removing impurities such as lubricants, solids, water, and air from used refrigerant and also potentially adjusting the composition of a refrigerant mixtures. Reclaim may be accomplished on site or at a "reclaimer" or entity which specializes in recovering, purifying and reselling used refrigerant. Recycling is intended to mean on-site removal of refrigerant from a system, then minimal to no cleanup and reintroduction into the same or similar system. Accordingly, the term "effective GWP", as used herein, refers to the GWP of a refrigerant mixture or blend containing a compound such as a hydrofluorocarbon or a hydrofluoroolefin which has been recovered from use in an apparatus or a system and subsequently reclaimed, recycled and/or purified according to one or more of the processes provided herein. The effective GWP of such a mixture can be reduced significantly relative to the GWP of a refrigerant mixture or blend that contains only "virgin" components that are newly manufactured for use in the refrigerant mixture or blend. The recovered and reclaimed/recycled/purified portion of the refrigerant blend does not add to the net global supply of global warming compounds in existence and, thus, the recovered portion of the refrigerant blend has zero contribution to GWP for the refrigerant mixture or blend. It should be noted that refrigerant may be recovered and re-used with no step of recycling, reclaiming or purification, but such re-use may not function as intended and may be detrimental to a system the unpurified refrigerant is later used in.

As used herein the term "Ozone depletion potential" (ODP) is defined in "The Scientific Assessment of Ozone Depletion, 2002, A report of the World Meteorological Association's Global Ozone Research and Monitoring Project," section 1.4.4, pages 1.28 to 1.31 (see first paragraph of this section). ODP represents the extent of ozone depletion in the stratosphere expected from a compound on a mass-for-mass basis relative to fluorotrichloromethane (CFC-11).

Coefficient of performance (COP) is the amount of heat removed in the evaporator divided by the energy required to operate the compressor. The higher the COP, the higher the energy efficiency. COP is directly related to the energy efficiency ratio (EER), that is, the efficiency rating for refrigeration or air conditioning equipment at a specific set of internal and external temperatures.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the term "consisting essentially of" is used to define a composition, method that includes materials, steps, features, components, or elements, in addition to those literally disclosed provided that these additional included materials, steps, features, components, or elements do not materially affect the basic and novel characteristic(s) of the claimed invention, especially the mode of action to achieve the desired result of any of the processes of the present invention. The term "consists essentially of" or "consisting essentially of" occupies a middle ground between "comprising" and "consisting of".

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

As used herein, the term "about" is meant to account for variations due to experimental error (e.g., plus or minus approximately 10% of the indicated value). All measurements reported herein are understood to be modified by the term "about", whether or not the term is explicitly used, unless explicitly stated otherwise.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

The following abbreviations may be used herein and would be readily understood by one of ordinary skill in the art:

CFC: chlorofluorocarbon

COP: coefficient of performance

GWP: global warming potential

HFC: hydrofluorocarbon

HCFC: hydrochlorofluorocarbon

HCFO: hydrochlorofluoroolefin

HFO: hydrofluoroolefin

ODP: ozone depletion potential

R-32 or HFC-32: difluoromethane

R-125 or HFC-125: pentafluoroethane

R-134a or HFC-134a: 1,1,1,2-tetrafluoroethane

R-152a or HFC-152a: 1,1-difluoroethane

R-134 or HFC-134: 1,1,2,2-tetrafluoroethane

R-227ea or HFC-227ea: 1,1,1,2,3,3,3-heptafluoropropane

HFO-1336mzz or 1336mzz: 1,1,1,4,4,4-hexafluorobut-2-ene (mixture of isomers)

HFO-1336mzz-(Z) or 1336mzz(Z): (Z)-1,1,1,4,4,4-hexafluorobut-2-ene

HFO-1336mzz-(E) or 1336mzz(E): (E)-1,1,1,4,4,4-hexafluorobut-2-ene

HFO-1225ye-(E) or 1225ye(E): (E)-1,2,3,3,3-pentafluoropropene

HFO-1234yf or 1234yf: 2,3,3,3-tetrafluoropropene

HFO-1234ze or 1234ze: 1,3,3,3-tetrafluoropropene (mixture of isomers)

HFO-1234ze-(Z) or 1234ze(Z): (Z)-1,3,3,3-tetrafluoropropene

HFO-1234ze-(E) or 1234ze(E): (E)-1,3,3,3-tetrafluoropropene

HFO-1123 or 1123: trifluoroethylene

HFO-1243zf or 1243zf: 3,3,3-trifluoropropene

R-407A: refrigerant blend designated by ASHRAE as containing R-32, R-125 and R-134a (at 20/20/40 weight percent, respectively)

R-407C: refrigerant blend designated by ASHRAE as containing R-32, R-125 and R-134a (at 23/25/52 weight percent, respectively)

R-410A: refrigerant blend designated by ASHRAE as containing R-32 and R-125 (at 50/50 weight percent, respectively)

R-454A: refrigerant blend designated by ASHRAE as containing R-32 and HFO-1234yf (at 35/65 weight percent, respectively)

R-454B: refrigerant blend designated by ASHRAE as containing R-32 and HFO-1234yf (at 68.9/31.1 weight percent, respectively)

R-454C: refrigerant blend designated by ASHRAE as containing R-32 and R-HFO-1234yf (at 21.5/78.5 weight percent, respectively)

R-449A: R454A: refrigerant blend designated by ASHRAE as containing R-32, R-125, R-134a and HFO-1234yf (at 24.3/24.7/25.7/25.3 weight percent, respectively)

R-513A: refrigerant blend designated by ASHRAE as containing R-134a and HFO-1234yf (at 44/56 weight percent, respectively)

Processes for Preparing the Compositions of the Invention

The present application provides a process of preparing a refrigerant blend comprising one or more recovered hydrofluorocarbon compounds, comprising:

(a) recovering the one or more hydrofluorocarbons from one or more refrigeration, air conditioning or heat pump systems;

(b) purifying the one or more hydrofluorocarbon compounds to form one or more purified hydrofluorocarbon compounds; and (c) blending the one or more purified hydrofluorocarbon compounds with one or more hydrofluoroolefins having a global warming potential of less than about 50 to form the refrigerant blend.

In some embodiments, the one or more hydrofluorocarbon compounds are selected from difluoromethane (R-32), pentafluoroethane (R-125), 1,1,1,2-tetrafluoroethane (R-134a), 1,1-difluoroethane (HFC-152a), 1,1,2,2-tetrafluoroethane (HFC-134), and 1,1,1,2,3,3,3-heptafluoropropane (HFC-227ea), or any mixture thereof.

In some embodiments, the hydrofluorocarbon compound is difluoromethane (R-32).

In some embodiments, the hydrofluorocarbon compound is pentafluoroethane (R-125).

In some embodiments, the hydrofluorocarbon compound is 1,1,1,2-tetrafluoroethane (R-134a).

In some embodiments, the hydrofluorocarbon compound is 1,1-difluoroethane (HFC-152a).

In some embodiments, the hydrofluorocarbon compound is 1,1,2,2-tetrafluoroethane (HFC-134).

In some embodiments, the hydrofluorocarbon compound is 1,1,1,2,3,3,3-heptafluoropropane (HFC-227ea).

In some embodiments, the hydrofluorocarbon is a mixture of two or more hydrofluorocarbons selected from difluoromethane (R-32), pentafluoroethane (R-125), 1,1,1,2-tetrafluoroethane (R-134a), 1,1-difluoroethane (HFC-152a), 1,1,2,2-tetrafluoroethane (HFC-134), and 1,1,1,2,3,3,3-heptafluoropropane (HFC-227ea), or any mixture thereof.

In some embodiments, the hydrofluorocarbon is a mixture of two, three, four, or five hydrofluorocarbons selected from difluoromethane (R-32), pentafluoroethane (R-125), 1,1,1,2-tetrafluoroethane (R-134a), 1,1-difluoroethane (HFC-152a), 1,1,2,2-tetrafluoroethane (HFC-134), and 1,1,1,2,3,3,3-heptafluoropropane (HFC-227ea), or any mixture thereof.

In some embodiments, the one or more hydrofluoroolefins have a global warming potential of less than about 40, less than about 30, less than about 20, less than about 10, less than about 5, less than about 2.5, or less than about 1.

In some embodiments, each of the one or more hydrofluoroolefins has an effective global warming potential of less than about 10. In some embodiments, each of the one or more hydrofluoroolefins has an effective global warming potential of less than about 2. In some embodiments, each of the one or more hydrofluoroolefins has an effective global warming potential of less than about 1.

In some embodiments, the one or more hydrofluoroolefins have a global warming potential of from about 1 to about 50, for example, about 1 to about 40, about 1 to about 30, about 1 to about 20, about 1 to about 10, about 1 to about 5, about 1 to about 2.5, about 2.5 to about 40, about 2.5 to about 30, about 2.5 to about 20, about 2.5 to about 10, about 2.5 to about 5, about 5 to about 40, about 5 to about 30, about 5 to about 20, about 5 to about 10, about 10 to about 40, about 10 to about 30, about 10 to about 20, about 20 to about 40, about 20 to about 30, or about 30 to about 40.

In some embodiments, the one or more hydrofluoroolefins have a global warming potential of from about 1 to about 10.

In some embodiments, the one or more hydrofluoroolefins have a global warming potential of from about 1 to about 5.

In some embodiments, the one or more hydrofluoroolefins have a global warming potential of from about 0.1 to about 1.

In some embodiments, each of the one or more purified refrigerant (either hydrofluorocarbon or hydrofluoroolefin) compounds has an effective global warming potential of less than 5, for example, less than 4, less than 3, less than 2, less than 1, or less than 0.1.

In some embodiments, each of the one or more purified refrigerant compounds has an effective global warming potential of about 0 to about 5, for example, about 0 to about 4, about 0 to about 3, about 0 to about 2, about 0 to about 1.

In some embodiments, each of the one or more purified refrigerant compounds has an effective global warming potential of about 0.

In some embodiments of the processes described herein, step (b) is performed one or more times prior to the mixing of step (c).

In some embodiments, step (b) is performed one or more times using one or more purification techniques, which may be the same or different.

In some embodiments, the one or more purified hydrofluorocarbon compounds exhibit about 1 to about 99.9% improved purity compared to the one or more hydrofluorocarbons prior to performing step (b), for example, about 1 to about 95%, about 1 to about 90%, about 1 to about 75%, about 1 to about 50%, about 1 to about 25%, about 1 to about 10%, about 10 to about 95%, about 10 to about 90%, about 10 to about 75%, about 10 to about 50%, about 10 to about 25%, about 25 to about 95%, about 25 to about 90%, about 25 to about 75%, about 25 to about 50%, about 50 to about 95%, about 50 to about 90%, about 50 to about 75%, about 75 to about 95%, or about 75 to about 90% improved purity compared to the one or more hydrofluorocarbons prior to performing step (b).

For example, the one or more purified hydrofluorocarbon compounds comprise a total amount of impurity (i.e., contaminant) that is equal to or less than the maximum allowable levels of contaminants as described in the AHRI Standard 700-2017 Specification for Refrigerants, the disclosure of which is incorporated herein by reference in its entirety.

For example, the one or more purified hydrofluorocarbon compounds comprise a total amount of impurity (i.e., contaminant) that is equal to or less than the maximum allowable levels of one or more of air and other non-condensables, water, volatile impurities, particulates/solids, chloride, and the like. Non-condensables can include, but are not limited to, oxygen, nitrogen, carbon dioxide, helium, argon, or any combination thereof.

For example, the one or more purified hydrofluorocarbon compounds comprise a total amount of impurity (i.e., contaminant) that is equal to or less than the maximum allowable levels of contaminants as described in any one of Tables 1-8, as described herein and in the AHRI Standard 700-2017 Specification for Refrigerants, the disclosure of which is incorporated herein by reference in its entirety.

TABLE 1

| | Units | R123 | R124 | R125 | R134a | R141b |
|---|---|---|---|---|---|---|
| Characteristics | | | | | | |
| Boiling Point | ° C. @ 101.3 kPa | 27.8 | −12 | −48.1 | −26.1 | 32 |
| Boiling Point Range | K | ±0.3 | ±0.3 | ±0.3 | ±0.3 | ±0.3 |
| Critical Temperature | ° C. | 183.7 | 122.3 | 66 | 101.1 | 206.8 |
| Isomer Content Isomer | % by wt | 0-8 R123a + R123b | 0-5 R124a | N/A | 0-0.5 R134 | 0-0.1ea R141, R141a |
| Vapor Phase Contaminants | | | | | | |
| Air and Other Non-condensables, Max | % by v @ 25.0° C. | N/A[2] | 1.5 | 1.5 | 1.5 | N/A[2] |
| Liquid Phase Contaminants | | | | | | |
| Water, Max | ppm by weight | 20 | 10 | 10 | 10 | 100 |
| All Other Volatile Impurities, Max | % by weight | 0.5 | 0.5 | 0.5 | 0.5 | 0.9 |
| High Boiling Residue, Max | % by v or % by wt | 0.01 | 0.01 | 0.01 | 0.01 | 0.01 |
| Particulates/ Solids | Pass or Fail | Visually Clean | Visually Clean | Visually Clean | Visually Clean | Visually Clean |
| Acidity, Max | ppm by wt (as HCl) | 1 | 1 | 1 | 1 | 1 |
| Chloride[a] | Pass or Fail | No Visible Turbidity | No Visible Turbidity | No Visible Turbidity | No Visible Turbidity | No Visible Turbidity |

| | Units | R142b | R143a | R152a | R218 | R227ea |
|---|---|---|---|---|---|---|
| Characteristics | | | | | | |
| Boiling Point | ° C. @ 101.3 kPa | −9.2 | −47.2 | −24 | −36.8 | −16.5 |
| Boiling Point Range | K | — | ±0.3 | ±0.3 | ±0.3 | — |
| Critical Temperature | ° C. | 137.1 | 72.7 | 113.3 | 72 | 101.7 |
| Isomer Content Isomer | % by wt | 0-0.1ea R142, R142a | 0-0.01 R143 | N/A | — | — |
| Vapor Phase Contaminants | | | | | | |
| Air and Other Non-condensables, Max | % by v @ 25.0° C. | 2 | 1.5 | 1.5 | 1.5 | 1.5 |
| Liquid Phase Contaminants | | | | | | |
| Water, Max | ppm by weight | 15 | 10 | 10 | 10 | 10 |
| All Other Volatile Impurities, Max | % by wt | 0.5 | 0.5 | 0.5 | 0.5 | 0.5 |
| High Boiling Residue, Max | % by v or % by wt | 0.01 | 0.01 | 0.01 | 0.01 | 0.01 |
| Particulates/ Solids | Pass or Fail | Visually Clean | Visually Clean | Visually Clean | Visually Clean | Visually Clean |
| Acidity, Max | ppm by wt (as HCl) | 3 | 1 | 1 | 1 | 1 |
| Chloride[a] | Pass or Fail | No Visible Turbidity | No Visible Turbidity | No Visible Turbidity | No Visible Turbidity | No Visible Turbidity |

[a]Recognized chloride level for pass/fail is about 3 ppm.

N/A Not Applicable

TABLE 2

| | Units | R236fa | R245fa | R1233zd (E) | R1234yf | R1234ze (E) | R1336mzz (Z) |
|---|---|---|---|---|---|---|---|
| | | | | Characteristics | | | |
| Boiling Point | ° C. @ 101.3 kPa | —1.4 | 14.9 | 18.3 | —29.4 | —19 | 33.4 |
| Boiling Point Range | K | ±0.3 | ±0.3 | — | N/A | N/A | N/A |
| Critical Temperature | ° C. | 124.9 | 154.1 | 165.6 | 94.8 | 109.4 | 171.3 |
| Isomer Content Isomer | % by wt | — | 0-0.1ea R245ca, R245cb, R245ea, R245eb | — | N/A | 0.3 R1234ze (Z) | 0-0.1 R1336mzz (E) |
| | | | Vapor Phase Contaminants | | | | |
| Air and Other Non-condensables, Max | % by v @ 25.0° C. | 1.5 | N/A | N/A | 1.5 | 1.5 | N/A |
| | | | Liquid phase Contaminants | | | | |
| Water, Max | ppm by wt | 10 | 20 | 20 | 10 | 10 | 20 |
| All Other Volatile Impurities, Max | % by wt | 0.5 | 0.5 | 0.5 | 0.5 | 0.5 | 0.5 |
| High Boiling Residue, Max | % by v or % by wt | 0.01 | 0.01 | 0.01 | 0.01 | 0.01 | 0.01 |
| Particulates/ Solids | Pass or Fail | Visually Clean | Visually Clean | Visually Clean | Visually Clean | Visually Clean | Visually Clean |
| Acidity, Max | ppm by wt (as HCl) | 1 | 1 | 1 | 1 | 1 | 1 |
| Chloride[a] | Pass or Fail | No Visible Turbidity | No Visible Turbidity | No Visible Turbidity | No Visible Turbidity | No Visible Turbidity | No Visible Turbidity |

[a]Recognized chloride level for pass/fail is about 3 ppm.
N/A Not Applicable

TABLE 3

| | Units | R50 | R170 | RE170 | R290 | R600 |
|---|---|---|---|---|---|---|
| | | | Characteristics | | | |
| Boiling Point | ° C. at 101.3 kPa | −161.5 | −88.6 | −24.8 | −42.1 | −0.5 |
| Boiling Point Range | K | ±0.5 | ±0.5 | ±0.5 | ±0.5 | ±0.5 |
| Minimum Nominal Composition | % wt | 99.5 | 99.5 | 99.5 | 99.5 | 99.5 |
| Other Allowable Impurities | % wt | N/A | N/A | N/A | 2[a] | 2[a] |
| | | | Vapor phase | | | |
| Air and Other Non-condensables, Max | % by v @ 25.0° C. | 1.5 | 1.5 | 1.5 | 1.5 | 1.5 |
| | | | Liquid Phase[b] | | | |
| Sulfur Odor | Pass or Fail | None | None | None | None | None |
| High Boiling Residue, Max | % wt | 0.01 | 0.01 | 0.01 | 0.01 | 0.01 |
| Particulates/ Solids | Pass or Fail | Visually Clean | Visually Clean | Visually Clean | Visually Clean | Visually Clean |
| Acidity, Max | ppm by wt (as HCl) | 1 | 1 | 1 | 1 | 1 |
| Water, Max | mg kg$^{-1}$ | 10 | 10 | 10 | 10 | 10 |
| All Other Volatile Impurities, Max | % wt | 0.5 | 0.5 | 0.5 | 0.5 | 0.5 |
| Total $C_3$, $C_4$ and $C_5$ Polyolefins, Max | % wt | 0.05 | 0.05 | 0.05 | 0.05 | 0.05 |

| | Units | R600a | R601 | R601a | R610 | R1150 | R1270 |
|---|---|---|---|---|---|---|---|
| | | | Characteristics | | | | |
| Boiling Point | ° C. at 101.3 kPa | −11.8 | 36.1 | 27.8 | 34.6 | −103.8 | −47.6 |

TABLE 3-continued

| Boiling Point Range | K | ±0.5 | ±0.5 | ±0.5 | ±0.5 | ±0.5 | ±0.5 |
|---|---|---|---|---|---|---|---|
| Minimum Nominal Composition | % wt | 99.5 | 99.5 | 99.5 | 99.5 | 99.5 | 99.5 |
| Other Allowable Impurities | % wt | $2^a$ | 0-1 R601a | 0-1 R601 | N/A | N/A | 0-1 R290 |
| | | | Vapor phase | | | | |
| Air and Other Non-condensables, Max | % by v @ 25.0° C. | 1.5 | 1.5 | 1.5 | 1.5 | 1.5 | 1.5 |
| | | | Liquid Phase$^b$ | | | | |
| Sulfur Odor | Pass or Fail | None | None | None | None | None | None |
| High Boiling Residue, Max | % wt | 0.01 | 0.01 | 0.01 | 0.01 | 0.01 | 0.01 |
| Particulates/Solids | Pass or Fail | Visually Clean | Visually Clean | Visually Clean | Visually Clean | Visually Clean | Visually Clean |
| Acidity, Max | ppm by wt (as HCl) | 1 | 1 | 1 | 1 | 1 | 1 |
| Water, Max | mg kg$^{-1}$ | 10 | 10 | 10 | 10 | 10 | 10 |
| All Other Volatile Impurities, Max | % wt | 0.5 | 0.5 | 0.5 | 0.5 | 0.5 | 0.5 |
| Total $C_3$, $C_4$ and $C_5$ Polyolefins, Max | % wt | 0.05 | 0.05 | 0.05 | 0.05 | 0.05 | 0.05 |

Notes:
$^a$2% of other C3 and C4 saturated hydrocarbons are allowed
$^b$Vaporized from liquid phase
N/A Not Applicable

TABLE 4

| | Units | R-744 |
|---|---|---|
| | Characteristics | |
| Sublimation Point | ° C. at 101.3 kPa | −78.4 |
| Sublimation Point Range | K | ±0.3 |
| | Vapor Phase$^a$: | |
| Air and other non-condensables, Max | % by volume at 10° C. below the critical temperature and measure non-condensable directly | 1.5 |

TABLE 4-continued

| | Units | R-744 |
|---|---|---|
| | Liquid Phase$^b$: | |
| Water, Max | ppm by wt | 10 |
| High Boiling Residue, Max | % by wt | 0.0005 |
| Particulates/Solids | Pass or Fail | Visually Clean |
| Minimum Purity | % by wt | 99.9 |

Notes:
$^a$Sample taken from vapor phase.
$^b$Sample vaporized from liquid phase.

TABLE 5

| | Units | R444A | R444B | R445A | R446A | R447A |
|---|---|---|---|---|---|---|
| | | Characteristics | | | | |
| Refrigerant Components | N/A | R-32/152a/ 1234ze(E) | R-32/152a/ 1234ze(E) | R-744/134a/ 1234ze(E) | R-32/ 1234ze(E)/600 | R-32/125/ 1234ze(E) |
| Nominal Composition | % by wt | 12.0/5.0/ 83.0 | 41.5/10.0/ 48.5 | 6.0/9.0/ 85.0 | 68.0/29.0/ 3.0 | 68.0/3.5/ 28.5 |
| Allowable Composition | % by weight | 11.0-13.0/ 4.0-6.0/ 81.0-85.0 | 40.5- 42.5/ 9.0-11.0/ 47.5-49.5 | 5.0-7.0/ 8.0-10.0/ 83.0-87.0 | 67.0-68.5/ 28.4-31.0/ 2.0-3.1 | 67.5-69.5/ 3.0-5.0/ 27.5-29.5 |
| Bubble Point | ° C.@ 101.3 kPa | −34.3 | −44.6 | −50.3 | −49.4 | −49.3 |
| Dew Point | ° C.@ 101.3 kPa | −22.8 | −30.5 | −30.6 | −43.2 | −50.3 |
| Critical Temperature | ° C. | 104.4 | 95.4 | 95.5 | 74.9 | 75.5 |
| | | Vapor Phase Contaminants | | | | |
| Air and Other Non-condensables, Maximum | % by v @ 25.0° C. | 1.5 | 1.5 | 1.5 | 1.5 | 1.5 |
| | | Liquid Phase Contaminants | | | | |
| Water, Maximum | ppm by wt | 10 | 10 | 10 | 10 | 10 |
| All Other Volatile Impurities, Maximum | % by wt | 0.5 | 0.5 | 0.5 | 0.5 | 0.5 |

TABLE 5-continued

| | | | | | | |
|---|---|---|---|---|---|---|
| High Boiling Residue, Maximum | % by v or % by wt | 0.01 | 0.01 | 0.01 | 0.01 | 0.01 |
| Particulate/ Solids | Pass or Fail | Visually clean | Visually clean | Visually clean | Visually clean | Visually clean |
| Acidity, Maximum | ppm by wt (as HCl) | 1 | 1 | 1 | 1 | 1 |
| Chloride[a] | Pass or Fail | No visible turbidity | No visible turbidity | No visible turbidity | No visible turbidity | No visible turbidity |

| | Units | R447B | R448A | R449A | R449B | R449C |
|---|---|---|---|---|---|---|
| | | | Characteristics | | | |
| Refrigerant Components | N/A | R-32/125/ 1234ze(E) | R-32/125/ 1234yf/134a/ 1234ze(E) | R-32/125/ 1234yf/134a | R-32/125/ 1234yf/134a | R-32/125/ 1234yf/134a |
| Nominal Composition | % by weight | 68.0/8.0/ 24.0 | 26.0/26.0/ 20.0/21.0/ 7.0 | 24.3/24.7/ 25.3/25.7 | 25.2/24.3/ 23.2/27.3 | 20.0/20.0/ 31.0/29.0 |
| Allowable Composition | % by weight | 66.0-69.0/ 7.0-10.0/ 22.0-25.0 | 24.0-26.5/ 25.5-28.0/ 18.0-20.5/ 20.0-23.0/ 5.0-7.5 | 23.3-24.5/ 24.5-25.7/ 24.3-25.5/ 25.5-26.7 | 23.7-25.5/ 24.0-25.8/ 21.7-23.5/ 27.0-28.8 | 18.5-20.5/ 19.5-21.5/ 29.5-31.5/ 28.5-30.5 |
| Bubble Point | °C.@ 101.3 kPa | −50.0 | −45.9 | −46 | −46.1 | −44.6 |
| Dew Point | °C.@ 101.3 kPa | −44.2 | −35 | −41.6 | −50.0 | −37.8 |
| Critical Temperature | °C. | 75.8 | 88 | 86.2 | 76.5 | 82.4 |
| | | | Vapor Phase Contaminants | | | |
| Air and Other Non-condensables, Maximum | % by volume @ 25.0° C. | 1.5 | 1.5 | 1.5 | 1.5 | 1.5 |
| | | | Liquid Phase Contaminants | | | |
| Water, Maximum | ppm by wt | 10 | 10 | 10 | 10 | 10 |
| All Other Volatile Impurities, Maximum | % by wt | 0.5 | 0.5 | 0.5 | 0.5 | 0.5 |
| High Boiling Residue, Maximum | % by v or % by wt | 0.01 | 0.01 | 0.01 | 0.01 | 0.01 |
| Particulate/ Solids | Pass or Fail | Visually Clean | Visually Clean | Visually Clean | Visually Clean | Visually Clean |
| Acidity, Maximum | ppm by wt (as HCl) | 1 | 1 | 1 | 1 | 1 |
| Chloride[a] | Pass or Fail | No Visible Turbidity | No Visible Turbidity | No Visible Turbidity | No Visible Turbidity | No Visible Turbidity |

Notes:

[a]Recognized chloride level for pass/fail is about 3 ppm.

N/A Not Applicable

TABLE 6

| | Units | R450A | R451A | R451B | R452A | R452B |
|---|---|---|---|---|---|---|
| | | | Characteristics | | | |
| Refrigerant Components | N/A | R134a/ 1234ze(E) | R1234yf/134a | R1234yf/134a | R32/R125/ R1234yf | R32/R125/ R1234yf |
| Nominal Composition | % by wt | 42.0/58.0 | 89.8/10.2 | 88.8/11.2 | 11.0/59.0/ 30.0 | 67.0/7.0/ 26.0 |
| Allowable Composition | % by wt | 40.0-44.0/ 56.0-60.0 | 89.6-90.0/ 10.0-10.4 | 88.6-89.0/ 11.0-11.4 | 9.3-12.7/ 57.2-60.8/ 29.0-30.1 | 65.0-69.0/ 5.5-8.5/ 24.0-28.0 |
| Bubble Point | °C.@ 101.3 kPa | −23.4 | −30.8 | −31 | −47.0 | −51.0 |
| Dew Point | °C.@ 101.3 kPa | −22.8 | −30.5 | −30.6 | −43.2 | −50.3 |
| Critical Temperature | °C. | 104.4 | 95.4 | 95.5 | 74.9 | 75.7 |

TABLE 6-continued

| | Vapor Phase Contaminants | | | | |
|---|---|---|---|---|---|
| Air and Other Non-condensables, Maximum | % by v @ 25.0° C. | 5.1 | 1.5 | 1.5 | 1.5 | 1.5 |

| | Liquid Phase Contaminants | | | | |
|---|---|---|---|---|---|
| Water, Maximum | ppm by wt | 10 | 10 | 10 | 10 | 10 |
| All Other Volatile Impurities, Maximum | % by wt | 0.5 | 0.5 | 0.5 | 0.5 | 0.5 |
| High Boiling Residue, Maximum | % by v or % by wt | 0.01 | 0.01 | 0.01 | 0.01 | 0.01 |
| Particulate/Solids | Pass or Fail | Visually Clean | Visually Clean | Visually Clean | Visually Clean | Visually Clean |
| Acidity, Maximum | ppm by wt (as HCl) | 1 | 1 | 1 | 1 | 1 |
| Chloride[a] | Pass or Fail | No Visible Turbidity | No Visible Turbidity | No Visible Turbidity | No Visible Turbidity | No Visible Turbidity |

| | Units | R452C | R453A | R454A | R454B | R454C |
|---|---|---|---|---|---|---|
| | | Characteristics | | | | |
| Refrigerant Components | N/A | R32/125/1234yf | R32/125/134a/227ea/600/601ea | R32/1234yf | R32/1234yf | R32/1234yf |
| Nominal Composition | % by wt | 12.5/61.0/26.5 | 20.0/20.0/53.8/5.0/0.6/0.6 | 35.0/65.0 | 68.9/31.1 | 21.5/78.5 |
| Allowable Composition | % by wt | 11.0-13.0/60.0-62.0/25.0-27.0 | 19.0-21.0/19.0-21.0/52.8-54.8/4.5-5.5/0.4-0.7/0.4-0.7 | 33.0-37.0/63.0-67.0 | 67.9-69.9/30.1-32.1 | 19.5-23.5/76.5-80.5 |
| Bubble Point | ° C.@ 101.3 kPa | −47.5 | −42.2 | −48.4 | −50.9 | −46.0 |
| Dew Point | ° C.@ 101.3 kPa | −44.2 | −35 | −41.6 | −50.0 | −37.8 |
| Critical Temperature | ° C. | 75.8 | 88 | 86.2 | 76.5 | 82.4 |
| | | Vapor Phase Contaminants | | | | |
| Air and Other Non-condensables, Maximum | % by volume @ 25.0° C. | 1.5 | 1.5 | 1.5 | 1.5 | 1.5 |
| | | Liquid Phase Contaminants | | | | |
| Water, Max | ppm by wt | 10 | 10 | 10 | 10 | 10 |
| All Other Volatile Impurities, Max | % by wt | 0.5 | 0.5 | 0.5 | 0.5 | 0.5 |
| High Boiling Residue, Max | % by v or % by wt | 0.01 | 0.01 | 0.01 | 0.01 | 0.01 |
| Particulates/Solids | Pass or Fail | Visually Clean | Visually Clean | Visually Clean | Visually Clean | Visually Clean |
| Acidity, Max | ppm by wt (as HCl) | 1 | 1 | 1 | 1 | 1 |
| Chloride[a] | Pass or Fail | No Visible Turbidity | No Visible Turbidity | No Visible Turbidity | No Visible Turbidity | No Visible Turbidity |

Notes:
[a]Recognized chloride level for pass/fail is about 3 ppm.
N/A Not Applicable

TABLE 7

| | Units | R455A | R456A | R457A | R458A |
|---|---|---|---|---|---|
| | | Characteristics | | | |
| Refrigerant Components | N/A | R744/32/1234yf | R32/134a/1234ze (E) | R32/1234yf/152a | R32/125/134a/227ea/236fa |

TABLE 7-continued

| | | | | | |
|---|---|---|---|---|---|
| Nominal Composition | % by wt | 3.0/ 21.5/ 75.5 | 6.0/ 45.0/ 49.0 | 18.0/ 70.0/ 12.0 | 20.5/ 4.0/ 61.4/ 13.5/ 0.6 |
| Allowable Composition | % by wt | 2.0-5.0/ 19.5-2.5/ 73.5-77.5 | 5.0-7.0/ 44.0-46.0/ 48.0-50.0 | 16.5-8.5/ 68.5-70.5/ 10.1-12.1 | 20.0-21.0/ 3.5-4.5/ 60.9-61.9/ 13.0-14.0/ 0.5-0.7 |
| Bubble Point[1] | ° C. @ 101.3 kPa | −51.6 | −30.4 | −42.7 | −39.8 |
| Dew Point[1] | ° C. @ 101.3 kPa | −39.1 | −25.6 | −35.5 | −32.4 |
| Critical Temperature | ° C. | 82.8 | 102.4 | 92.6 | 92.0 |
| Vapor Phase Contaminants | | | | | |
| Air and Other Non-condensables, Maximum | % by volume @ 25.0° C. | 5.1 | 1.5 | 1.5 | 1.5 |
| Liquid Phase Contaminants | | | | | |
| Water, Max | ppm by wt | 10 | 10 | 10 | 10 |
| All Other Volatile Impurities, Max | % by wt | 0.5 | 0.5 | 0.5 | 0.5 |
| High Boiling Residue, Max | % by v or % by wt | 0.01 | 0.01 | 0.01 | 0.01 |
| Particulates/ Solids | Pass or Fail | Visually Clean | Visually Clean | Visually Clean | Visually Clean |
| Acidity, Max | ppm by wt (as HCl) | 1 | 1 | 1 | 1 |
| Chloride[a] | Pass or Fail | No Visible Turbidity | No Visible Turbidity | No Visible Turbidity | No Visible Turbidity |

| | Units | R459A | R459B | R460A | R460B |
|---|---|---|---|---|---|
| Characteristics | | | | | |
| Refrigerant Components | N/A | 32/ 1234yf/ 1234ze (E) | 32/ 1234yf/ 1234ze (E) | 32/ 125/ 134a/ 1234ze (E) | 32/ 125/ 134a/ 1234ze (E) |
| Nominal Composition | % by wt | 68.0/ 26.0/ 6.0 | 21.0/ 69.0/ 10.0 | 12.0/ 52.0/ 14.0/ 22.0 | 28.0/ 25.0/ 20.0/ 27.0 |
| Allowable Composition | % by wt | 66.5-68.5/ 24.0-28.0/ 5.5-7.5 | 20.0-21.5/ 67.0-71.0/ 9.0-11.0 | 11.0-13.0/ 51.0-53.0/ 13.0-15.0/ 21.0-23.0 | 27.0-29.0/ 24.0-26.0/ 19.0-21.0/ 26.0-28.0 |
| Bubble Point[1] | ° C. @ 101.3 kPa | −50.3 | −44.0 | −44.6 | −45.2 |
| Dew Point[1] | ° C. @ 101.3 kPa | −48.6 | −36.1 | −37.2 | −37.1 |
| Critical Temperature | ° C. | 81.5 | 89.8 | 81.6 | 85.7 |
| Vapor Phase Contaminants | | | | | |
| Air and Other Non-condensables, Maximum | % by volume @ 25.0° C. | 1.5 | 1.5 | 1.5 | 1.5 |
| Liquid Phase Contaminants | | | | | |
| Water, Max | ppm by wt | 10 | 10 | 10 | 10 |
| All Other Volatile Impurities, Max | % by wt | 0.5 | 0.5 | 0.5 | 0.5 |

TABLE 7-continued

| | | | | | |
|---|---|---|---|---|---|
| High Boiling Residue, Max | % by v or % by wt | 0.01 | 0.01 | 0.01 | 0.01 |
| Particulates/ Solids | Pass or Fail | Visually Clean | Visually Clean | Visually Clean | Visually Clean |
| Acidity, Max | ppm by wt (as HCl) | 1 | 1 | 1 | 1 |
| Chloride[a] | Pass or Fail | No Visible Turbidity | No Visible Turbidity | No Visible Turbidity | No Visible Turbidity |

Notes:
[a]Recognized chloride level for pass/fail is about 3 ppm.
N/A Not Applicable

TABLE 8

| | Units | R513A | R513B | R515A |
|---|---|---|---|---|
| Characteristics | | | | |
| Refrigerant Components | N/A | R1234yf/ 134a | R1234yf/ 134a | R1234ze(E)/ 227ea |
| Nominal Composition | % by wt | 56.0/44.0 | 58.5/41.5 | 88.0/12.0 |
| Allowable Composition | % by wt | 55.0-57.0/ 43.0-45.0 | 58.0-59.0/ 41.0-42.0 | 86.0-89.0/ 11.0-14.0 |
| Bubble Point | ° C. @ 101.3 kPa | −29.2 | −29.2 | −18.9 |
| Dew Point | ° C. @ 101.3 kPa | −29.1 | −29.1 | −18.9 |
| Critical Temperature | ° C. | 96.5 | 95.5 | 108.4 |
| Vapor Phase Contaminants | | | | |
| Air and Other Non-condensables, Maximum | % by volume @ 25.0° C. | 1.5 | 1.5 | 1.5 |
| Liquid Phase Contaminants | | | | |
| Water, Max | ppm by wt | 10 | 10 | 10 |
| All Other Volatile Impurities, Max | % by wt | 0.5 | 0.5 | 0.5 |
| High Boiling Residue, Max | % by v or % by wt | 0.01 | 0.01 | 0.01 |
| Particulates/ Solids | Pass or Fail | Visually Clean | Visually Clean | Visually Clean |
| Acidity, Max | ppm by wt (as HCl) | 1 | 1 | 1 |
| Chloride[a] | Pass or Fail | No Visible Turbidity | No Visible Turbidity | No Visible Turbidity |

Notes:
[a]Recognized chloride level for pass/fail is about 3 ppm.
N/A Not Applicable In some embodiments, the processes provided herein further comprise:
    (d) recovering the one or more hydrofluoroolefins from one or more refrigeration, air conditioning or heat pump systems.

In some embodiments, step (d) is performed prior to the blending of step (c).

In some embodiments, the processes provided herein further comprise:
    (e) purifying the one or more hydrofluoroolefins to form one or more purified hydrofluoroolefins.

In some embodiments, step (e) is performed prior to the blending of step (c).

In some embodiments, the processes provided herein further comprise:

(d) recovering the one or more hydrofluoroolefins from one or more refrigeration, air conditioning, or heat pump systems; and
    (e) purifying the one or more hydrofluoroolefins to form one or more purified hydrofluoroolefins.

In some embodiments, steps (d) and (e) are each performed prior to the blending of step (c).

In some embodiments, the one or more purified hydrofluoroolefin compounds exhibit about 1 to about 99.9% improved purity compared to the one or more hydrofluoroolefins prior to performing step (b), for example, about 1 to about 95%, about 1 to about 90%, about 1 to about 75%, about 1 to about 50%, about 1 to about 25%, about 1 to about 10%, about 10 to about 95%, about 10 to about 90%, about 10 to about 75%, about 10 to about 50%, about 10 to about 25%, about 25 to about 95%, about 25 to about 90%, about 25 to about 75%, about 25 to about 50%, about 50 to about 95%, about 50 to about 90%, about 50 to about 75%, about 75 to about 95%, or about 75 to about 90% improved purity compared to the one or more hydrofluoroolefins prior to performing step (b).

For example, the one or more purified hydrofluoroolefin compounds comprise a total amount of impurity (i.e., contaminant) that is equal to or less than the maximum allowable levels of contaminants as described in the AHRI Standard 700-2017 Specification for Refrigerants, the disclosure of which is incorporated herein by reference in its entirety.

For example, the one or more purified hydrofluoroolefin compounds comprise a total amount of impurity (i.e., contaminant) that is equal to or less than the maximum allowable levels of one or more of air and other non-condensables, water, volatile impurities, particulates/solids, chloride, and the like.

For example, the one or more purified hydrofluoroolefin compounds comprise a total amount of impurity (i.e., contaminant) that is equal to or less than the maximum allowable levels of contaminants as described in any one of Tables 1-8, as described herein and in the AHRI Standard 700-2017 Specification for Refrigerants, the disclosure of which is incorporated herein by reference in its entirety.

In some embodiments, the one or more hydrofluoroolefins are selected from the group consisting of (Z)-1,1,1,4,4,4-hexafluorobut-2-ene (HFO-1336mzz-(Z)), (E)-1,1,1,4,4,4-hexafluorobut-2-ene (HFO-1336mzz-(E)), 2,3,3,3-tetrafluoropropene (HFO-1234yf), (E)-1,3,3,3-tetrafluoropropene (HFO-1234ze-(E)), trifluoroethylene (HFO-1123), (E)-1,2,3,3,3-pentafluoropropene (HFO-1225ye-(E), and 3,3,3-trifluoropropene (HFO-1243zf), or any mixture thereof.

In some embodiments, the hydrofluorocarbon compound is difluoromethane (R-32).

In some embodiments, the hydrofluoroolefin is 2,3,3,3-tetrafluoropropene (HFO-1234yf).

In some embodiments, the hydrofluoroolefin is (Z)-1,1,1,4,4,4-hexafluorobut-2-ene (HFO-1336mzz-(Z)).

In some embodiments, the hydrofluoroolefin is (E)-1,1,1,4,4,4-hexafluorobut-2-ene (HFO-1336mzz-(E)).

In some embodiments, the hydrofluoroolefin is (E)-1,3,3,3-tetrafluoropropene (HFO-1234ze-(E)).

In some embodiments, the hydrofluoroolefin is trifluoroethylene (HFO-1123).

In some embodiments, the hydrofluoroolefin is (E)-1,2,3,3-pentafluoropropene (HFO-1225ye-(E)).

In some embodiments, the hydrofluoroolefin is 3,3,3-trifluoropropene (HFO-1243zf).

In some embodiments, the hydrofluoroolefin is a mixture of any two or more hydrofluoroolefins selected from (Z)-1,1,1,4,4,4-hexafluorobut-2-ene (HFO-1336mzz-(Z)), (E)-1,1,1,4,4,4-hexafluorobut-2-ene (HFO-1336mzz-(E)), 2,3,3,3-tetrafluoropropene (HFO-1234yf), (E)-1,3,3,3-tetrafluoropropene (HFO-1234ze-(E)), trifluoroethylene (HFO-1123), (E)-1,2,3,3,3-pentafluoropropene (HFO-1225ye-(E), and 3,3,3-trifluoropropene (HFO-1243zf).

In some embodiments, the hydrofluoroolefin is a mixture of any two, three, four, or five, hydrofluoroolefins selected from (Z)-1,1,1,4,4,4-hexafluorobut-2-ene (HFO-1336mzz-(Z)), (E)-1,1,1,4,4,4-hexafluorobut-2-ene (HFO-1336mzz-(E)), 2,3,3,3-tetrafluoropropene (HFO-1234yf), (E)-1,3,3,3-tetrafluoropropene (HFO-1234ze-(E)), trifluoroethylene (HFO-1123), (E)-1,2,3,3,3-pentafluoropropene (HFO-1225ye-(E), and 3,3,3-trifluoropropene (HFO-1243zf).

In some embodiments, the hydrofluorocarbon is a mixture of difluoromethane (R-32) and pentafluoroethane (R-125).

In some embodiments, the hydrofluorocarbon is a mixture of difluoromethane (R-32), pentafluoroethane (R-125), and 1,1,1,2-tetrafluoroethane (R-134a).

In some embodiments, the refrigerant blend prepared according to a process described herein comprises:

about 21 to about 22 weight percent purified difluoromethane (R-32); and about 78 to about 79 weight percent 2,3,3,3-tetrafluoropropene (HFO-1234yf).

In some embodiments, the refrigerant blend prepared according to a process described herein consists essentially of:

about 21 to about 22 weight percent purified difluoromethane (R-32); and about 78 to about 79 weight percent 2,3,3,3-tetrafluoropropene (HFO-1234yf).

In some embodiments, the refrigerant blend prepared according to a process described herein consists of:

about 21 to about 22 weight percent purified difluoromethane (R-32); and about 78 to about 79 weight percent 2,3,3,3-tetrafluoropropene (HFO-1234yf).

In some embodiments, the refrigerant blend prepared according to a process described herein comprises:

about 68 to about 69 weight percent purified difluoromethane (R-32); and about 30 to about 31 weight percent 2,3,3,3-tetrafluoropropene (HFO-1234yf).

In some embodiments, the refrigerant blend prepared according to a process described herein consists essentially of:

about 68 to about 69 weight percent purified difluoromethane (R-32); and about 30 to about 31 weight percent 2,3,3,3-tetrafluoropropene (HFO-1234yf).

In some embodiments, the refrigerant blend prepared according to a process described herein consists of:

about 68 to about 69 weight percent purified difluoromethane (R-32); and about 30 to about 31 weight percent 2,3,3,3-tetrafluoropropene (HFO-1234yf).

In some embodiments, the refrigerant blend prepared according to a process described herein comprises:

about 34 to about 36 weight percent purified difluoromethane (R-32); and about 64 to about 66 weight percent 2,3,3,3-tetrafluoropropene (HFO-1234yf).

In some embodiments, the refrigerant blend prepared according to a process described herein consists essentially of:

about 34 to about 36 weight percent purified difluoromethane (R-32); and about 64 to about 66 weight percent 2,3,3,3-tetrafluoropropene (HFO-1234yf).

In some embodiments, the refrigerant blend prepared according to a process described herein consists of:

about 34 to about 36 weight percent purified difluoromethane (R-32); and about 64 to about 66 weight percent 2,3,3,3-tetrafluoropropene (HFO-1234yf).

In some embodiments, the refrigerant blend prepared according to a process described herein comprises:

about 66 to about 68 weight percent purified difluoromethane (R-32);

about 6 to about 8 weight percent purified pentafluoroethane (R-125); and about 25 to about 27 weight percent 2,3,3,3-tetrafluoropropene (HFO-1234yf).

In some embodiments, the refrigerant blend prepared according to a process described herein consists essentially of:

about 66 to about 68 weight percent purified difluoromethane (R-32);

about 6 to about 8 weight percent purified pentafluoroethane (R-125); and about 25 to about 27 weight percent 2,3,3,3-tetrafluoropropene (HFO-1234yf).

In some embodiments, the refrigerant blend prepared according to a process described herein consists of:

about 66 to about 68 weight percent purified difluoromethane (R-32);

about 6 to about 8 weight percent purified pentafluoroethane (R-125); and about 25 to about 27 weight percent 2,3,3,3-tetrafluoropropene (HFO-1234yf).

In some embodiments, the refrigerant blend prepared according to a process described herein comprises:

about 24 to about 25 weight percent purified difluoromethane (R-32);

about 24 to about 25 weight percent purified pentafluoroethane (R-125);

about 25 to about 26 weight percent purified 1,1,1,2-tetrafluoroethane (R-134a); and about 25 to about 26 weight percent 2,3,3,3-tetrafluoropropene (HFO-1234yf).

In some embodiments, the refrigerant blend prepared according to a process described herein consists essentially of:

about 24 to about 25 weight percent purified difluoromethane (R-32);

about 24 to about 25 weight percent purified pentafluoroethane (R-125);

about 25 to about 26 weight percent purified 1,1,1,2-tetrafluoroethane (R-134a); and about 25 to about 26 weight percent 2,3,3,3-tetrafluoropropene (HFO-1234yf).

In some embodiments, the refrigerant blend prepared according to a process described herein consists of:

about 24 to about 25 weight percent purified difluoromethane (R-32);

about 24 to about 25 weight percent purified pentafluoroethane (R-125);

about 25 to about 26 weight percent purified 1,1,1,2-tetrafluoroethane (R-134a); and about 25 to about 26 weight percent 2,3,3,3-tetrafluoropropene (HFO-1234yf).

In some embodiments, the refrigerant blend prepared according to a process described herein comprises:

about 43 to about 45 weight percent purified 1,1,1,2-tetrafluoroethane (R-134a); and about 55 to about 57 weight percent 2,3,3,3-tetrafluoropropene (HFO-1234yf).

In some embodiments, the refrigerant blend prepared according to a process described herein consists essentially of:

about 43 to about 45 weight percent purified 1,1,1,2-tetrafluoroethane (R-134a); and about 55 to about 57 weight percent 2,3,3-tetrafluoropropene (HFO-1234yf).

In some embodiments, the refrigerant blend prepared according to a process described herein consists of:

about 43 to about 45 weight percent purified 1,1,1,2-tetrafluoroethane (R-134a); and about 55 to about 57 weight percent 2,3,3,3-tetrafluoropropene (HFO-1234yf).

In some embodiments of the processes described herein, the purifying of step (b) comprises removing solid impurities from the one or more hydrofluorocarbon compounds.

In some embodiments, the solid impurities are removed by one or more purification techniques independently selected from filtration. Filtration types or methods can include pressure, vacuum, membrane centrifugal, gravity, depth filters, granular beds, cartridge filters using carbon, fibers or metals, and precoat filtration. Filtration is particularly useful for removal or solid particles such as metal fines and insoluble polymers, plastics and elastomers.

In some embodiments, the purifying of step (b) comprises removing liquid impurities, gaseous impurities, or a combination thereof, from the one or more hydrofluorocarbon compounds.

In some embodiments, the liquid impurities, gaseous impurities, or a combination thereof are removed by one or more purification techniques independently selected from distillation, decantation, contact with molecular sieves, and vapor space purging. Molecular sieves are particularly useful for water removal and vapor space purging for air removal. Distillation and decantation are effective for removal of organic, oligomer and soluble polymeric impurities.

In some embodiments, the purifying of step (e) comprises removing solid impurities from the one or more hydrofluoroolefins.

In some embodiments, the solid impurities are removed by one or more purification techniques independently selected from pressure filtration, vacuum filtration, membrane centrifugal filtration, gravity filtration, depth filter filtration, granular bed filtration, cartridge filtration using carbon, fiber or metal filtration, and precoat filtration.

In some embodiments, the purifying of step (e) comprises removing liquid impurities, gaseous impurities, or a combination thereof, from the one or more hydrofluoroolefins.

In some embodiments, the liquid impurities, gaseous impurities, or a combination thereof are removed by one or more purification techniques independently selected from distillation, contact with molecular sieves, and vapor space purging.

In some embodiments, the present application further provides a process of reducing the global warming potential of a refrigerant blend, comprising:

(a) selecting one or more hydrofluorocarbons recovered from one or more refrigeration, air conditioning, or heat pump systems;

(b) purifying the one or more hydrofluorocarbon compounds to form one or more purified hydrofluorocarbon compounds; and (c) blending the one or more purified hydrofluorocarbon compounds with one or more hydrofluoroolefins having a global warming potential of less than about 50 to form a purified refrigerant blend;

wherein the purified refrigerant blend has a reduced global warming potential compared to a refrigerant blend comprising the one or more hydrofluoroolefins and one or more hydrofluorocarbon compounds which have not been recovered and purified according to steps (b)-(c);

wherein the one or more hydrofluorocarbon compounds are selected from difluoromethane (R-32), pentafluoroethane (R-125), 1,1,1,2-tetrafluoroethane (R-134a), 1,1-difluoroethane (HFC-152a), 1,1,2,2-tetrafluoroethane (HFC-134), and 1,1,1,2,3,3,3-heptafluoropropane (HFC-227ea).

In some embodiments, the refrigerant blend has an effective global warming potential which is about 5% or less compared to the GWP of a refrigerant blend comprising the one or more hydrofluoroolefins and one or more hydrofluorocarbon compounds which have not been recovered and purified according to steps (b)-(c), for example, about 10% or less, about 20% or less, about 30% or less, about 40% or less, about 50% or less, about 60% or less, about 70% or less, about 80% or less, about 90% or less, or about 99% or less.

In some embodiments, the purified refrigerant blend has an effective global warming potential which is about 5% or less compared to the GWP of a refrigerant blend comprising the one or more hydrofluoroolefins and one or more hydrofluorocarbon compounds which have not been recovered and purified according to steps (b)-(c).

In some embodiments, the refrigerant blend has an effective global warming potential which is about 1% or less compared to the GWP to a refrigerant blend comprising the one or more hydrofluoroolefins and one or more hydrofluorocarbon compounds which have not been recovered and purified according to steps (b)-(c).

In some embodiments, the refrigerant blend has an effective global warming potential which is about 5% to about 99% of the GWP of a refrigerant blend comprising the one or more hydrofluoroolefins and one or more hydrofluorocarbon compounds which have not been recovered and purified according to steps (b)-(c), for example, about 5% to about 90%, about 5% to about 80%, about 5% to about 70%, about 5% to about 60%, about 5% to about 50%, about 5% to about 40%, about 5% to about 30%, about 5% to about 20%, or about 5% to about 10%.

Methods of Use

The compositions prepared according to the processes described herein can act as a working fluid used to carry heat from a heat source to a heat sink. Such heat transfer compositions may also be useful as a refrigerant in a cycle wherein the fluid undergoes a phase change; that is, from a liquid to a gas and back, or vice versa. Exemplary heat transfer systems include, but are not limited to, air conditioners (e.g., automotive air conditioners), freezers, refrigerators, heat pumps, chillers (e.g., water chillers, flooded evaporator chillers, direct expansion chillers, centrifugal chillers), walk-in coolers, high temperature heat pumps, mobile refrigerators, mobile air conditioning units, immersion cooling systems, data-center cooling systems, and combinations thereof.

Mechanical vapor-compression refrigeration, air conditioning and heat pump systems include an evaporator, a compressor, a condenser, and an expansion device. A refrigeration cycle re-uses refrigerant in multiple steps producing a cooling effect in one step and a heating effect in a different step. The cycle can be described as follows: Liquid refrigerant enters an evaporator through an expansion device, and the liquid refrigerant boils in the evaporator, by withdrawing heat from the environment, at a low temperature to form a gas and produce cooling. Often air or a heat transfer fluid flows over or around the evaporator to transfer the cooling effect caused by the evaporation of the refrigerant in the evaporator to a body to be cooled. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

A body to be cooled or heated may be defined as any space, location, object or body for which it is desirable to provide cooling or heating. Examples include spaces (open or enclosed) requiring air conditioning, cooling, or heating, such as a room, an apartment, or building, such as an apartment building, university dormitory, townhouse, or other attached house or single-family home, hospitals, office buildings, supermarkets, college or university classrooms or administration buildings and automobile or truck passenger compartments. Additionally, a body to be cooled may include electronic devices, such as computer equipment, central processing units (cpu), data-centers, server banks, and personal computers among others.

By "in the vicinity of" is meant that the evaporator of the system containing the refrigerant composition is located either within or adjacent to the body to be cooled, such that air moving over the evaporator would move into or around the body to be cooled. In the process for producing heating, "in the vicinity of" means that the condenser of the system containing the refrigerant composition is located either within or adjacent to the body to be heated, such that the air moving over the evaporator would move into or around the body to be heated. In some embodiments, for heat transfer, "in the vicinity of" may mean that the body to be cooled is immersed directly in the heat transfer composition or tubes containing heat transfer compositions run into around internally, and out of electronic equipment, for instance.

Examples of refrigeration systems the compositions provided herein may be useful in are equipment including commercial, industrial or residential refrigerators and freezers, ice machines, self-contained coolers and freezers, flooded evaporator chillers, direct expansion chillers, screw chillers, scroll chiller, centrifugal chillers, walk-in and reach-in coolers and freezers, and combination systems. In some embodiments, the compositions provided herein may be used in supermarket refrigeration systems. Additionally, stationary applications may utilize a secondary loop system that uses a primary refrigerant to produce cooling in one location that is transferred to a remote location via a secondary heat transfer fluid.

In some embodiments, the compositions provided herein are useful in mobile heat transfer systems, including refrigeration, air conditioning, or heat pump systems or apparatuses. In some embodiments, the compositions provided herein are useful in stationary heat transfer systems, including refrigeration, air conditioning, or heat pump systems or apparatuses.

As used herein, mobile refrigeration, air conditioning, or heat pump systems refers to any refrigeration, air conditioner, or heat pump apparatus incorporated into a transportation unit for the road, rail, sea, or air. Mobile air conditioning or heat pumps systems may be used in automobiles, trucks, railcars, or other transportation systems. In particular, mobile heat pumps may be useful for hybrid or electric vehicles that do not include a combustion engine to produce heat. Mobile refrigeration may include transport refrigeration in trucks, airplanes, or rail cars. In addition, apparatuses which are meant to provide refrigeration for a system independent of any moving carrier, known as "intermodal" systems, are included in the present invention. Such intermodal systems include "containers" (e.g., combined sea/land transport) as well as "swap bodies" (e.g., combined road and rail transport).

As used herein, stationary air conditioning or heat pump systems are systems that are fixed in place during operation. A stationary air conditioning or heat pump system may be associated within or attached to buildings of any variety. These stationary applications may be stationary air conditioning and heat pumps, including but not limited to chillers, heat pumps, including residential and high temperature heat pumps, residential, commercial or industrial air conditioning systems, and including window, ductless, ducted, packaged terminal, and those exterior but connected to the building such as rooftop systems.

Stationary heat transfer may refer to systems for cooling electronic devices, such as immersion cooling systems, submersion cooling systems, phase change cooling systems, data-center cooling systems or simply liquid cooling systems.

In some embodiments, a method is provided for using the present compounds or compositions as a heat transfer fluid. The method comprises transporting said composition from a heat source to a heat sink.

In some embodiments, a method is provided for producing cooling comprising evaporating any of the compositions disclosed herein in the vicinity of a body to be cooled, and thereafter condensing said composition.

In some embodiments, a method is provided for producing heating comprising condensing any of the compositions disclosed herein in the vicinity of a body to be heated, and thereafter evaporating said compositions.

In some embodiments, the compositions provided herein are useful in heat transfer applications, wherein the working fluid is a heat transfer component. Preferably, the composition for use as a heat transfer component has a boiling point range of −60° C. to 300° C.

In some embodiments, the compositions provided herein are for use in refrigeration or air conditioning. Preferably, the composition for use as refrigerant or air conditioning component has a boiling point range of –80° C. to 35° C. For some chiller applications, the boiling point range is preferably 0° C. to 35° C.

The compounds or compositions disclosed herein may be useful as a replacement for a currently used (e.g., "incumbent") refrigerant, including but not limited to R-123 (or HFC-123, 2,2-dichloro-1,1,1-trifluoroethane), R-11 (or CFC-11, trichlorofluoromethane), R-12 (or CFC-12, dichlorodifluoromethane), HFC-134a (1,1,1,2-tetrafluoroethane), HFC-32 (difluoromethane), R-22 (chlorodifluoromethane), R-245fa (or HFC-245fa, 1,1,1,3,3-pentafluoropropane), R-114 (or CFC-114, 1,2-dichloro-1,1,2,2-tetrafluoroethane), R-236fa (or HFC-236fa, 1,1,1,3,3,3-hexafluoropropane), R-236ea (or HFC-236ea, 1,1,1,2,3,3-hexafluoropropane), R-124 (or HCFC-124, 2-chloro-1,1,1,2-tetrafluoroethane), among others.

As used herein, the term "incumbent refrigerant" shall be understood to mean the refrigerant for which the heat transfer system was designed to operate, or the refrigerant that is resident in the heat transfer system.

Often, replacement refrigerants are most useful if capable of being used in the original refrigeration equipment designed for a different refrigerant, e.g., with minimal to no system modifications. In many applications, some embodiments of the disclosed compositions are useful as refrigerants and provide at least comparable cooling performance (meaning cooling capacity) as the refrigerant for which a replacement is being sought.

Refrigeration capacity (sometimes referred to as cooling capacity) is a term to define the change in enthalpy of a refrigerant or working fluid in an evaporator per unit mass of refrigerant or working fluid circulated. Volumetric cooling capacity refers to the amount of heat removed by the refrigerant or working fluid in the evaporator per unit volume of refrigerant vapor exiting the evaporator. The refrigeration capacity is a measure of the ability of a refrigerant, working fluid or heat transfer composition to produce cooling. Therefore, the higher the volumetric cooling capacity of the working fluid, the greater the cooling rate that can be produced at the evaporator with the maximum volumetric flow rate achievable with a given compressor. Cooling rate refers to the heat removed by the refrigerant in the evaporator per unit time.

Similarly, volumetric heating capacity is a term to define the amount of heat supplied by the refrigerant or working fluid in the condenser per unit volume of refrigerant or working fluid vapor entering the compressor. The higher the volumetric heating capacity of the refrigerant or working fluid, the greater the heating rate that is produced at the condenser with the maximum volumetric flow rate achievable with a given compressor.

In some embodiments, the present application provides a method for operating a heat transfer system or for transferring heat that is designed to operate with an incumbent refrigerant by charging an empty system with a composition disclosed herein, or by substantially replacing said incumbent refrigerant with a composition disclosed herein.

As used herein, the term "substantially replacing" shall be understood to mean allowing the incumbent refrigerant to drain from the system, or pumping the incumbent refrigerant from the system, and then charging the system with a composition disclosed herein. The system may be flushed with one or more quantities of the replacement refrigerant before being charged. It shall be understood that in some embodiments, some small quantity of the incumbent refrigerant may be present in the system after the system has been charged with the composition provided herein.

In another embodiment is provided a method for recharging a heat transfer system that contains an incumbent refrigerant and a lubricant, said method comprising substantially removing the incumbent refrigerant from the heat transfer system while retaining a substantial portion of the lubricant in said system and introducing one of the compositions provided herein to the heat transfer system. In some embodiments, the lubricant in the system is partially replaced.

As used herein, the term "lubricant" refers to any material added to a composition or a compressor (and in contact with any heat transfer composition in use within any heat transfer system) that provides lubrication to the compressor to aid in preventing parts from seizing.

In some embodiments, the compositions provided herein may be used to top-off a refrigerant charge in a chiller. For example, if a chiller using R-449A has diminished performance due to leakage of refrigerant, the compositions disclosed herein may be added to the chiller to bring performance back up to specification.

In some embodiments, a heat exchange system containing any of the presently disclosed compositions is provided, wherein said system is selected from the group consisting of air conditioners, freezers, refrigerators, heat pumps, water chillers, flooded evaporator chillers, direct expansion chillers, screw chillers, scroll chillers, centrifugal chillers, walk-in coolers, heat pumps, mobile refrigerators, mobile air conditioning units, and systems having combinations thereof. Additionally, the compositions provided herein may be useful in secondary loop systems wherein these compositions serve as the primary refrigerant thus providing cooling to a secondary heat transfer fluid that thereby cools a remote location.

The compositions provided herein may have some temperature glide in the heat exchangers described herein. Thus, the systems may operate more efficiently if the heat exchangers are operated in counter-current mode or cross-current mode with counter-current tendency. Counter-current tendency means that the closer the heat exchanger can get to counter-current mode the more efficient the heat transfer. Thus, air conditioning heat exchangers, in particular evaporators, are designed to provide some aspect of counter-current tendency.

Therefore, provided herein is an air conditioning or heat pump system wherein said system includes one or more heat exchangers (e.g., evaporators, condensers, or both) that operate in counter-current mode or cross-current mode with counter-current tendency.

In some embodiments, provided herein is a refrigeration system wherein said system includes one or more heat exchangers (e.g., evaporators, condensers, or both) that operate in counter-current mode or cross-current mode with counter-current tendency.

In some embodiments, the refrigeration, air conditioning, or heat pump system is a stationary refrigeration, air conditioning, or heat pump system. In some embodiments the refrigeration, air conditioning, or heat pump system is a mobile refrigeration, air conditioning, or heat pump system.

Additionally, in some embodiments the compositions disclosed herein may function as primary refrigerants in secondary loop systems that provide cooling to remote locations by use of a secondary heat transfer fluid, which may comprise water, an aqueous salt solution (e.g., calcium chloride), a glycol, carbon dioxide, or a fluorinated hydrocarbon fluid (e.g, an HFC, HCFC, HFO, HCFO, CFO, or PFC). In this case, the secondary heat transfer fluid is the body to be cooled as it is adjacent to the evaporator and is cooled before moving to a second remote body to be cooled. In some embodiments, the compositions disclosed herein may function as the secondary heat transfer fluid, thus transferring or providing cooling (or heating) to the remote location.

In some embodiments, the compositions provided herein comprise one or more non-refrigerant components (also referred to herein as additives) selected from the group consisting of lubricants, dyes (e.g., UV dyes), solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof. Indeed, many of these optional non-refrigerant components fit into one or more of these categories and may have qualities that lend themselves to achieve one or more performance characteristics.

In some embodiments, one or more non-refrigerant components are present in small amounts relative to the overall composition. In some embodiments, the amount of additive (s) concentration in the disclosed compositions is from less than about 0.1 weight percent to as much as about 5 weight percent of the total composition. In some embodiments of the present invention, the additives are present in the disclosed compositions in an amount between about 0.1 weight percent to about 5 weight percent of the total composition or in an amount between about 0.1 weight percent to about 3.5 weight percent. The additive component(s) selected for the disclosed composition is selected on the basis of the utility and/or individual equipment components or the system requirements.

In some embodiments, the lubricant is selected from the group consisting of mineral oil, alkylbenzene, polyol esters, polyalkylene glycols, polyvinyl ethers, polycarbonates, perfluoropolyethers, silicones, silicate esters, phosphate esters, paraffins, naphthenes, polyalpha-olefins, and combinations thereof.

The lubricants as disclosed herein may be commercially available lubricants. For example, the lubricant may be paraffinic mineral oil, sold by BVA Oils as BVM 100 N, naphthenic mineral oils sold by Crompton Co. under the trademarks Suniso® 1GS, Suniso® 3GS and Suniso® SGS, naphthenic mineral oil sold by Pennzoil under the trademark Sontex® 372LT, naphthenic mineral oil sold by Calumet Lubricants under the trademark Calumet® RO-30, linear alkylbenzenes sold by Shrieve Chemicals under the trademarks Zerol® 75, Zerol® 150 and Zerol® 500 and branched alkylbenzene sold by Nippon Oil as HAB 22, polyol esters (POEs) sold under the trademark Castrol® 100 by Castrol, United Kingdom, polyalkylene glycols (PAGs) such as RL-488A from Dow (Dow Chemical, Midland, Michigan), and any mixture thereof.

Notwithstanding the above weight ratios for compositions disclosed herein, it is understood that in some heat transfer systems, while the composition is being used, it may acquire additional lubricant from one or more equipment components of such heat transfer system. For example, in some refrigeration, air conditioning, and heat pump systems, lubricants may be charged in the compressor and/or the compressor lubricant sump. Such lubricant would be in addition to any lubricant additive present in the refrigerant in such a system. In use, the refrigerant composition when in the compressor may pick up an amount of the equipment lubricant to change the refrigerant-lubricant composition from the starting ratio.

The non-refrigerant component used with the compositions of the present invention may include at least one dye. In some embodiments, the dye comprises at least one ultra-violet (UV) dye. As used herein, "ultra-violet" dye is defined as a UV fluorescent or phosphorescent composition that absorbs light in the ultra-violet or "near" ultra-violet region of the electromagnetic spectrum. The fluorescence produced by the UV fluorescent dye under illumination by a UV light that emits at least some radiation with a wavelength in the range of from about 10 nanometers to about 775 nanometers may be detected.

UV dye is a useful component for detecting leaks of the composition by permitting one to observe the fluorescence of the dye at or in the vicinity of a leak point in an apparatus (e.g., refrigeration unit, air-conditioner or heat pump). The UV emission, (e.g., fluorescence from the dye) may be observed under an ultra-violet light. Therefore, if a composition containing such a UV dye is leaking from a given point in an apparatus, the fluorescence can be detected at the leak point, or in the vicinity of the leak point.

In some embodiments, the UV dye may be a fluorescent dye. In some embodiments, the fluorescent dye is selected from the group consisting of naphthalimides, perylenes, coumarins, anthracenes, phenanthracenes, xanthenes, thioxanthenes, naphthoxanthenes, fluoresceins, and any mixture thereof.

In some embodiments, the compositions of the present invention comprise at least one solubilizing agent. In some embodiments, the solubilizing agent is selected to improve the solubility of one or more dye in the disclosed compositions. In some embodiments, the weight ratio of dye to solubilizing agent in the composition ranges from about 99:1 to about 1:1. Exemplary solubilizing agents include, but are not limited to, at least one compound selected from the group consisting of hydrocarbons, hydrocarbon ethers, polyoxyalkylene glycol ethers (e.g., dipropylene glycol dimethyl ether), amides, nitriles, ketones, chlorocarbons (e.g., methylene chloride, trichloroethylene, chloroform, or mixtures thereof), esters, lactones, aromatic ethers, fluoroethers, 1,1, 1-trifluoroalkanes, and any mixture thereof.

In some embodiments, the non-refrigerant component comprises at least one compatibilizer. As used herein, the term "compatibilizers" refers to compounds which improve solubility of the hydrofluorocarbon of the disclosed compositions in heat transfer system lubricants. In some embodiments, the compatibilizers improve oil return to the compressor. In some embodiments, the composition is used with a system lubricant to reduce oil-rich phase viscosity.

In some embodiments, the compatibilizer improves the compatibility of one or more lubricants with the disclosed compositions. In some embodiments, the compatibilizer is selected from the group consisting of hydrocarbons, hydrocarbon ethers, polyoxyalkylene glycol ethers (e.g., dipropylene glycol dimethyl ether), amides, nitriles, ketones, chlorocarbons (e.g., methylene chloride, trichloroethylene, chloroform, or mixtures thereof), esters, lactones, aromatic ethers, fluoroethers, 1,1,1-trifluoroalkanes, and any mixture thereof.

In some embodiments, the solubilizing agent and/or compatibilizer is selected from the group consisting of hydrocarbon ethers. In some embodiments, the hydrocarbon ethers consist of ethers containing only carbon, hydrogen, and oxygen, such as dimethyl ether (DME).

In some embodiments, the compatibilizer may be linear or cyclic aliphatic or aromatic hydrocarbon compatibilizer containing from 3 to 15 carbon atoms. In some embodiments, the compatibilizer comprises at least one hydrocarbon, selected from the group consisting of propanes, including propylene and propane, butanes, including n-butane and isobutene, pentanes, including n-pentane, isopentane, neopentane and cyclopentane, hexanes, octanes, nonane, decanes, and the like. In some embodiments, the compatibilizer is a commercially available hydrocarbon including, but are not limited to, those from Exxon Chemical (USA) sold under the trademarks Isopar® H, a mixture of undecane $(C_{11})$ and dodecane $(C_{12})$ (a high purity $C_{11}$ to $C_{12}$ iso-paraffinic), Aromatic 150 (a $C_9$ to $C_{11}$ aromatic) (Aromatic 200 (a $C_9$ to $C_{15}$ aromatic) and Naptha 140 (a mixture of $C_5$ to $C_{11}$ paraffins, naphthenes and aromatic hydrocarbons) and any mixture thereof.

In some embodiments, the compatibilizer may comprise at least one polymeric compatibilizer. In some embodiments, the polymeric compatibilizer may be a random copolymer of fluorinated and non-fluorinated acrylates, wherein the polymer comprises repeating units of at least one monomer represented by the formulae $CH_2$=$C(R^1)CO_2R^2$, $CH_2$=$C(R^3)C_6H_4R^4$, and $CH_2$=$C(R^5)C_6H_4XR^6$, wherein X is oxygen or sulfur; $R^1$, $R^3$, and $R^5$ are independently selected from the group consisting of H and $C_1$-$C_4$ alkyl radicals; and $R^2$, $R^4$, and $R^6$ are independently selected from the group consisting of carbon-chain-based radicals containing C, and F, and may further contain H, Cl, ether oxygen, or sulfur in the form of thioether, sulfoxide, sulfone, and mixtures thereof. Examples of such polymeric compatibilizers include those commercially available from E. I. du Pont de Nemours and Company, (Wilmington, DE, 19898, USA) under the trademark Zonyl® PHS. Zonyl® PHS is a random copolymer made by polymerizing 40 weight percent $CH_2$=$C(CH_3)CO_2CH_2CH_2(CF_2CF_2)_mF$ (also referred to as Zonyl® fluoromethacrylate or ZFM) wherein m is from 1 to 12, primarily 2 to 8, and 60 weight percent lauryl methacrylate $(CH_2$=$C(CH_3)CO_2(CH_2)_{11}CH_3$, also referred to as LMA).

In some embodiments, the compatibilizer component contains from about 0.01 to 30 weight percent (based on total amount of compatibilizer) of an additive which reduces the surface energy of metallic copper, aluminum, steel, or other metals and metal alloys thereof found in heat exchangers in a way that reduces the adhesion of lubricants to the metal. Examples of metal surface energy reducing additives include those commercially available from DuPont under the trademarks Zonyl® FSA, Zonyl® FSP, and Zonyl® FSJ.

In some embodiments, the compositions provided herein further comprise a non-refrigerant component which is a metal surface deactivator. In some embodiments, the metal surface deactivator is selected from the group consisting of areoxalyl bis (benzylidene) hydrazide (CAS reg no. 6629-10-3), N,N'-bis(3,5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7), ethylenediaminetetraacetic acid (CAS reg no. 60-00-4), or a salt of any of the aforementioned, and any mixture thereof.

The non-refrigerant components described provided may further comprise a stabilizer selected from the group consisting of hindered phenols, thiophosphates, butylated triphenylphosphorothionates, organo phosphates, organo phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, hydrazones, such as acetaldehyde dimethylhydrazone, ionic liquids, and any mixture thereof.

In some embodiments, the stabilizer is selected from the group consisting of tocopherol; hydroquinone; t-butyl hydroquinone; monothiophosphates; and dithiophosphates, commercially available from Ciba Specialty Chemicals, Basel, Switzerland, hereinafter "Ciba", under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168 and Tris-(di-tert-butylphenyl)phosphite, commercially available from Ciba under the trademark Irgafos® OPH; (Di-n-octyl phosphite); and iso-decyl diphenyl phosphite, commercially available from Ciba under the trademark Irgafos® DDPP; trialkyl phosphates, such as trimethyl phosphate, triethylphosphate, tributyl phosphate, trioctyl phosphate, and tri(2-ethylhexyl)phosphate; triaryl phosphates including triphenyl phosphate, tricresyl phosphate, and trixylenyl phosphate; and mixed alkyl-aryl phosphates including isopropylphenyl phosphate (IPPP), and bis(t-butylphenyl)phenyl phosphate (TBPP); butylated triphenyl phosphates, such as those commercially available under the trademark Syn-O-Ad® including Syn-O-Ad® 8784; tert-butylated triphenyl phosphates such as those commercially available under the trademark Durad® 620; isopropylated triphenyl phosphates such as those commercially available under the trademarks Durad® 220 and Durad® 110; anisole; 1,4-dimethoxybenzene; 1,4-diethoxybenzene; 1,3,5-trimethoxybenzene; myrcene, alloocimene, limonene (in particular, d-limonene); retinal; pinene; menthol; geraniol; farnesol; phytol; Vitamin A; terpinene; delta-3-carene; terpinolene; phellandrene; fenchene; dipentene; caratenoids, such as lycopene, beta carotene, and xanthophylls, such as zeaxanthin; retinoids, such as hepaxanthin and isotretinoin; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and any mixture thereof.

In some embodiments, the compositions provided herein further comprise an additive which is an ionic liquid stabilizer. In some embodiments, the ionic liquid stabilizer is selected from the group consisting of organic salts that are liquid at room temperature (approximately 25° C.). In some embodiments, the organic salts comprise cations selected from the group consisting of pyridinium, pyridazinium, pyrimidinium, pyrazinium, imidazolium, pyrazolium, thiazolium, oxazolium and triazolium and any mixture thereof; and anions selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, and $F^-$, and any mixture thereof. In some embodiments, ionic liquid stabilizer is selected from the group consisting of emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

In some embodiments, the compositions provided herein further comprise stabilizer which is a hindered phenol. In some embodiments, the hindered phenyl is any substituted phenol compound, including phenols comprising one or more substituted or cyclic, straight chain, or branched aliphatic substituent group, such as, alkylated monophenols including 2,6-di-tert-butyl-4-methylphenol; 2,6-di-tert-butyl-4-ethylphenol; 2,4-dimethyl-6-tertbutylphenol; tocopherol; and the like, hydroquinone and alkylated hydroquinones including t-butyl hydroquinone, other derivatives of hydroquinone; and the like, hydroxylated thiodiphenyl ethers, including 4,4'-thio-bis(2-methyl-6-tertbutylphenol); 4,4'-thiobis(3-methyl-6-tertbutylphenol); 2,2'-thiobis(4methyl-6-tert-butylphenol); and the like, alkylidene-bisphenols including: 4,4'-methylenebis(2,6-ditert-butylphenol); 4,4'-bis(2,6-di-tert-butylphenol); derivatives of 2,2'- or 4,4-biphenoldiols; 2,2'-methylenebis(4-ethyl-6-tertbutylphenol); 2,2'-methylenebis(4-methyl-6-tertbutylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol; 2,2'-methylenebis(4-methyl-6-cyclohexylphenol, 2,2- or 4,4-biphenyldiols including 2,2'-methylenebis(4-ethyl-6-tert-butylphenol); butylated hydroxytoluene (BHT, or 2,6-di-tert-butyl-4-methylphenol), bisphenols comprising heteroatoms including 2,6-di-tert-alpha-dimethylamino-p-cresol, 4,4-thiobis(6-tert-butyl-m-cresol); and the like; acylaminophenols; 2,6-di-tert-butyl-4(N,N'-dimethylaminomethylphenol); sulfides including; bis(3-methyl-4-hydroxy-5-tertbutylbenzyl)sulfide; bis(3,5-di-tert-butyl-4-hydroxybenzyl) sulfide, and any mixture thereof.

In some embodiments, the compositions provided herein further comprise a non-refrigerant component which is a tracer. In some embodiments, the tracer comprises two or more tracer compounds from the same class of compounds or from different classes of compounds. In some embodiments, the tracer is present in the compositions at a total concentration of about 50 parts per million by weight (ppm) to about 1000 ppm, based on the weight of the total composition. In other embodiments, the tracer is present in the composition at a total concentration of about 50 ppm to about 500 ppm. In some embodiments, the tracer is present in the composition at a total concentration of about 100 ppm to about 300 ppm.

In some embodiments, the tracer is selected from the group consisting of hydrofluorocarbons (HFCs), deuterated hydrofluorocarbons, perfluorocarbons, fluoroethers, brominated compounds, iodated compounds, alcohols, aldehydes and ketones, nitrous oxide, and any combination thereof. In some embodiments, the tracer is selected from the group consisting of fluoroethane, 1,1-difluoroethane, 1,1,1-trifluoroethane, 1,1,1,3,3,3-hexafluoropropane, 1,1,1,2,3,3,3-heptafluoropropane, 1,1,1,3,3-pentafluoropropane, 1,1,1,3,3-pentafluorobutane, 1,1,1,2,3,4,4,5,5,5-decafluoropentane, 1,1,1,2,2,3,4,5,5,6,6,7,7,7-tridecafluoroheptane, iodotrifluoromethane, deuterated hydrocarbons, deuterated hydrofluorocarbons, perfluorocarbons, fluoroethers, brominated compounds, iodated compounds, alcohols, aldehydes, ketones, nitrous oxide ($N_2O$), and any mixture thereof. In some embodiments, the tracer may be added to the compositions of the present invention in predetermined quantities to allow detection of any dilution, contamination or other alteration of the composition.

In some embodiments, compositions provided herein further comprise an additive which is a perfluoropolyether as described in U.S. Patent Publication No.: 2007-0284555, the disclosure of which is incorporated herein by reference in its entirety.

It will be recognized that certain additives referenced herein as suitable for the non-refrigerant component have been identified as potential refrigerants. However, in accordance with this invention, when these additives are used, they are not present at an amount that would affect the novel and basic characteristics of the refrigerant mixtures of this invention.

As described herein, the compositions prepared according to the processes of the present invention have zero ozone depletion potential and low global warming potential (GWP). Additionally, the compositions provided herein may have global warming potentials that are less than many hydrofluorocarbon refrigerants currently in use. Therefore, in accordance with the present invention, the compositions described herein may be useful in methods for producing cooling, producing heating, and transferring heat.

EXAMPLES

The invention will be described in greater detail by way of specific examples. The following examples are offered for illustrative purposes, and are not intended to limit the invention in any manner.

Example 1. Preparation of Compositions Having Reduced Effective GWP

Because GWP is a measure of how much energy the emissions of 1 ton of a gas will absorb over a given period of time, a compound (e.g., a hydrofluorocarbon or a hydrofluoroolefin) which is reclaimed from use in an apparatus or a system and subsequently recycled and/or purified will contribute a minimal or zero "effective GWP" compared to newly manufactured compound. For example, as shown in Table 9, the composition R-449A is a refrigerant mixture containing 24.3 wt % HFC-32, 24.7 wt % HFC-125, 25.7 wt % HFC-134a, and 25.3 wt % HFO-1234yf, and having a GWP of 1282. By preparing R-449A with one or more recycled/reclaimed/purified components (e.g., components recovered from a refrigerant apparatus or system, subsequently purified, and blended to formulate the R-449A), the GWP of the R-449A can be reduced by up to 99%. In the data provided in Table 9, the recovered/recycled/reclaimed portion of the refrigerant blend is considered to contribute zero to the effective GWP of the refrigerant blend.

TABLE 9

| Composition | GWP | % Reclaimed Component(s) | "Effective" GWP | GWP Reduction (%) |
|---|---|---|---|---|
| R-449A | 1282 | 0 | 1282 | 0 |
| R-449A formulated with recycled/reclaimed R-134a | — | 0.26 | 948 | 26 |
| R-449A formulated with recycled/reclaimed R-32 & R-125 (R-410A) | — | 0.49 | 344 | 73 |
| R-449A formulated with recycled/reclaimed R-32, and R-134a (R-407A) | — | 0.49 | 477 | 63 |
| R-449A formulated with recycled/reclaimed R-32, R-125, and R-134a (R-407C) | — | 0.62 | 94 | 93 |
| R-449A formulated with recycled/reclaimed R-32, R-125 (R-410A), and R-134a | — | 0.75 | 10 | 99 |

Tables 10-11 show that the GWP of R-513A (44 wt % HFC-134a, 56 wt % HFO-1234yf) and R-452B (67 wt % HFC-32, 7 wt % HFC-125, 26 wt % HFO-1234yf) can be lowered by 99.9% and 40%, respectively, using recovered/recycled/reclaimed HFC components.

TABLE 10

| Composition | GWP | % Reclaimed Component(s) | "Effective" GWP | GWP Reduction (%) |
|---|---|---|---|---|
| R-513A | 573 | 0 | 573 | 0 |
| R-513A formulated with recycled/reclaimed R-134a | — | 0.44 | 1 | 99.9 |

TABLE 11

| Composition | GWP | % Reclaimed Component(s) | "Effective" GWP | GWP Reduction (%) |
|---|---|---|---|---|
| R-452B | 676 | 0 | 676 | 0 |
| R-452B formulated with recycled/reclaimed HFC-32 and HFC-125 (R-410A) | — | 0.14 | 406 | 40 |

Example 2. Process for Preparing R-449A Using Virgin Feedstock

The refrigerant R-449A is nominally a mixture of 24.3 weight percent HFC-32, 24.7 weight percent HFC-125, 25.7 weight percent HFC-134a, and 25.3 weight percent HFO-1234yf. When blended using virgin feedstocks of the four components (i.e., newly manufactured components), R-449A has a GWP of ~1281. An exemplary process for preparing 1 kg of R-449A is described below:
1. Prepare a refrigerant container by cleaning, drying, and evacuating a blend container.

2. Attach a transfer line from the blend container to a supply container of HFC-134a.
3. Transfer by weighing 253 g HFC-134a into the blend container.
4. Attach a transfer line from the blend container to a supply container of HFO-1234yf.
5. Transfer by weighing 257 g HFO-1234yf into the blend container.
6. Attach a transfer line from the blend container to a supply container of HFC-125.
7. Transfer by weighing 247 g HFC-125 into the blend container.
8. Attach a transfer line from the blend container to a supply container of HFC-32.
9. Transfer by weighing 243 g HFC-32 into the blend container.
10. Thoroughly mix the components in the blend container by rolling or other means for ~1 hour.
11. Obtain a sample of the liquid phase of the refrigerant from the blend container and analyze by gas chromatography (GC) to confirm that the measured composition of the prepared R-449A is within acceptable specification and tolerances.

Example 3. Process for Preparing R-449A Using Recycled R-134a 1 kg of R-449A is prepared using 26% recovered/recycled/reclaimed HFC content and will exhibit a ~26% lower "effective" GWP when prepared using recovered and reclaimed and/or recycled R-134a according to an exemplary procedure described below:
1. Prepare a refrigerant container by cleaning, drying, and evacuating a blend container.
2. Attach a transfer line from the empty evacuated blend container, to a supply container of recycled or reclaimed HFC-134a.
3. Transfer by weighing 253 grams of the recycled or reclaimed HFC-134a into the blend container;
   a. The recovered HFC-134a can be obtained by removing used HFC-134a from a refrigeration apparatus or system (e.g., an appliance, automotive, or any other refrigeration, air conditioning, or heat pump system);
   b. Impurities in the recovered HFC-134a must be removed from the recovered HFC-134a prior to using it to prepare a new blend;

c. Impurities include any solid, liquid, or gas that are not desirable to have in a new refrigerant blend, including, but not limited to rust, oil(s), dirt, water, air, other non-condensable gases, and the like.

d. Removal of impurities can be accomplished by a variety of methods including, but not limited to, filtration, driers using molecular sieves, distillation, vapor space purging, and the like.

4. Attach a transfer line from the blend container to a supply container of HFO-1234yf.

5. Transfer by weighing 257 g HFO-1234yf into the blend container.

6. Attach a transfer line from the blend container to a supply container of HFC-125.

7. Transfer by weighing 247 g HFC-125 into the blend container.

8. Attach a transfer line from the blend container to a supply container of HFC-32.

9. Transfer by weighing 243 g HFC-32 into the blend container.

10. Thoroughly mix the components in the blend container by rolling or other means for ~1 hour 11. Obtain a sample of the liquid phase of the refrigerant from the blend container and analyze by GC to confirm that the measured composition of the prepared R-449A is within acceptable specification and tolerances.

12. It may be necessary to add one or more of the individual components to the prepared mixture in the blend container to bring the total composition within specification.

Example 4. Process for Preparing R-449A Using Recycled R-410A 1 kg of R-449A is prepared using 49% recycled/reclaimed HFC content and will exhibit a ~73% lower "effective" GWP when prepared using reclaimed and/or recycled R-410A according to an exemplary procedure described below:

1. Follow steps 1-5 from Example 3.

2. After the HFC-134a and HFO-1234yf have be loaded into a blend container, instead of continuing by adding the HFC-125 and HFC-32 as individual components, add recovered/recycled/reclaimed R-410A as follows.

3. Attach a transfer line from the empty evacuated blend container, to a supply container of recovered R-410A (a 50/50 weight % blend of R-125 and R-32).

4. Transfer by weighing 490 g R-410A into the blend container.

a. The recovered R-410A can be obtained by removing used R-410A from a refrigeration apparatus or system (e.g., an appliance, automotive, or any other refrigeration, air conditioning, or heat pump system);

b. Impurities in the recovered R-410A must be removed from the recovered R-410A prior to using it to prepare a new refrigerant blend, including, but not limited to rust, oil(s), dirt, water, air, other non-condensable gases, and the like.

c. Removal of impurities can be accomplished by a variety of methods including, but not limited to, filtration, driers using molecular sieves, distillation, vapor space purging, and the like.

5. Thoroughly mix the components in the blend container by rolling or other means for ~1 hour.

6. Obtain a sample of the liquid phase of the refrigerant from the blend container and analyze by GC to confirm that the measured composition of the prepared R-449A is with acceptable specification and tolerances.

7. It may be necessary to add one or more of the individual components to the prepared mixture in the blend container to bring the total composition within specification.

Example 5. Process for Preparing R-449A Using Recycled R-407A 1 kg of R-449A is prepared using 62% recycled/reclaimed HFC content and will exhibit a ~93% lower "effective" GWP when prepared using recovered and reclaimed and/or recycled R-407A (mixture of HFC-32/HFC-125/HFC-134a at 20/40/40 wt %, respectively) according to an exemplary procedure described below:

1. Prepare a refrigerant container by cleaning, drying, and evacuating a blend container 2. Attach a transfer line from the blend container to a supply container of HFO-1234yf.

3. Transfer by weighing 250 g HFO-1234yf into the blend container.

4. Attach a transfer line from the blend container, to a supply container of R-407A.

5. Transfer by weighing 625 g of recovered R-407A into the cylinder.

a. The recovered R-407A can be obtained by removing used R-407A from a refrigeration apparatus or system (e.g., an appliance, automotive, or any other refrigeration, air conditioning, or heat pump system);

b. Impurities in the recovered R-407A purity must be removed from the recovered R-407A prior to using it to prepare a new refrigerant blend, including, but not limited to rust, oil(s), dirt, water, air, other non-condensable gases, and the like.

c. Removal of impurities can be accomplished by a variety of methods including, but not limited to, filtration, driers using molecular sieves, distillation, vapor space purging, and the like.

6. Attach a transfer line from the blend container to a supply container of HFC-32.

7. Transfer by weighing 125 g HFC-32 into the blend container.

8. Thoroughly mix the components in the blend container by rolling or other means for ~1 hour.

9. Obtain a sample of the liquid phase of the refrigerant from the blend container and analyze by GC to confirm that the measured composition of the prepared R-449A is with acceptable specification and tolerances.

10. It may be necessary to add one or more of the individual components to the prepared mixture in the blend container to bring the total composition within specification.

Example 6. Process for Preparing R-449A Using Recycled R-134a and Recycled R-410A 1 kg of R-449A is prepared using 75% recycled/reclaimed HFC content and will exhibit a >99% lower "effective" GWP when prepared using recovered, reclaimed and/or recycled R-134a and R-410A, according to an exemplary procedure described below:

1. Prepare a refrigerant container by cleaning, drying, and evacuating a blend container.

2. Attaching a transfer line from the blend container, to a supply container of recovered HFC-134a.

3. Transfer by weighing 253 grams of recovered HFC-134a into the cylinder.

a. The recovered HFC-134a can be obtained by removing used HFC-134a from a refrigeration apparatus or system (e.g., an appliance, automotive, or any other refrigeration, air conditioning, or heat pump system);

b. Impurities in the recovered HFC-134a must be removed from the recovered HFC-134a prior to using it to prepare a new refrigerant blend, including, but not limited to rust, oil(s), dirt, water, air, other non-condensable gases, and the like.

c. Removal of impurities can be accomplished by a variety of methods including, but not limited to, filtration, driers using molecular sieves, distillation, vapor space purging, and the like.

4. Attach a transfer line from the blend container to a supply container of HFO-1234yf.

5. Transfer by weighing 257 g HFO-1234yf into the blend container.

6. Attach a transfer line from the blend container to a supply container of recycled/reclaimed/recovered R-410A.

7. Transfer by weighing 490 g R-410A into the cylinder.

a. The recovered R-410A can be obtained by removing used R-410A from a refrigeration apparatus or system (e.g., an appliance, automotive, or any other refrigeration, air conditioning, or heat pump system);

b. Impurities in the recovered R-410A must be removed from the recovered R-410A prior to using it to prepare a new refrigerant blend, including, but not limited to rust, oil(s), dirt, water, air, other non-condensable gases, and the like.

c. Removal of impurities can be accomplished by a variety of methods including, but not limited to, filtration, driers using molecular sieves, distillation, vapor space purging, and the like.

8. Thoroughly mix the components in the blend container by rolling or other means for ~1 hour 9. Obtain a sample of the liquid phase of the refrigerant from the blend container and analyze by GC to confirm that the measured composition of the prepared R-449A is within acceptable specification and tolerances.

Example 7. Process for Preparing R-513A Using Recycled R-134a 1 kg of is R-513A prepared using 44% recycled/reclaimed HFC content and will exhibit a >99% lower "effective" GWP when prepared using recovered, reclaimed and/or recycled R-134a, according to an exemplary procedure described below:

1. Prepare a refrigerant container by cleaning, drying, and evacuating a blend container.

2. Attach a transfer line from the blend container, to a supply container of recovered HFC-134a.

3. Transfer by weighing 440 g recovered HFC-134a into the blend container.

a. The recovered HFC-134a can be obtained by removing used HFC-134a from a refrigeration apparatus or system (e.g., an appliance, automotive, or any other refrigeration or air conditioning system);

b. Impurities in the recovered HFC-134a purity must be removed from the recovered HFC-134a prior to using it to prepare a new refrigerant blend, including, but not limited to rust, oil(s), dirt, water, air, other non-condensable gases, and the like.

c. Removal of impurities can be accomplished by a variety of methods including, but not limited to, filtration, driers using molecular sieves, distillation, vapor space purging, and the like.

4. Attach a transfer line from the blend container to a supply container of HFO-1234yf.

5. Transfer by weighing 560 g HFO-1234yf into the blend container.

6. Thoroughly mix the components in the blend container by rolling or other means for ~1 hour.

7. Obtain a sample of the liquid phase of the refrigerant from the blend container and analyze by GC to confirm that the measured composition of the prepared R-513A is within acceptable specification and tolerances.

8. It may be necessary to add one or more of the individual components to the prepared mixture in the blend container to bring the total composition within specification.

Example 8. Process for Preparing R-454A Using Recycled HFC-32

1 kg of R-454A is prepared using 35% recycled/reclaimed HFC content and will exhibit a >99% lower "effective" GWP when prepared using reclaimed and/or recycled R-32, according to an exemplary procedure described below:

1. Prepare a refrigerant container by cleaning, drying, and evacuating a blend container 2. Attach a transfer line from the blend container, to a supply container of recovered HFC-32

3. Transfer by weighing 350 g recovered HFC-32 into the cylinder a. The recovered HFC-32 can be obtained by removing used HFC-32 from a refrigeration apparatus or system (e.g., an appliance, automotive, or any other refrigeration, air conditioning, or heat pump system);

b. Impurities in the recovered HFC-32 purity must be removed from the recovered HFC-32 prior to using it to prepare a new refrigerant blend, including, but not limited to rust, oil(s), dirt, water, air, other non-condensable gases, and the like.

c. Removal of impurities can be accomplished by a variety of methods including, but not limited to, filtration, driers using molecular sieves, distillation, vapor space purging, and the like.

4. Attach a transfer line from the blend container to a supply container of HFO-1234yf.

5. Transfer by weighing 650 g HFO-1234yf into the blend container.

6. Thoroughly mix the components in the blend container by rolling or other means for ~1 hour.

7. Obtain a sample of the liquid phase of the refrigerant from the blend container and analyze by GC to confirm that the measured composition of the prepared R-454A is within specification and tolerances.

8. It may be necessary to add one or more of the individual components to the prepared mixture in the blend container to bring the total composition within specification.

Example 9. Process for Preparing R-454B Using Recycled HFC-32

1 kg of R-454B is prepared using 68.9% recycled/reclaimed HFC content and will exhibit a >99% lower "effective" GWP when prepared using reclaimed and/or recycled R-32, according to an exemplary procedure described below:

1. Prepare a refrigerant container by cleaning, drying, and evacuating a blend container
2. Attach a transfer line from the empty evacuated container, to a supply container of recovered HFC-32.
3. Transfer by weighing 689 g recovered HFC-32 into the blend container.
   a. The recovered HFC-32 can be obtained by removing used HFC-32 from a refrigeration apparatus or system (e.g., an appliance, automotive, or any other refrigeration, air conditioning, or heat pump system);
   b. Impurities in the recovered HFC-32 purity must be removed from the recovered HFC-32 prior to using it to prepare a new refrigerant blend, including, but not limited to rust, oil(s), dirt, water, air, other non-condensable gases, and the like.
   c. Removal of impurities can be accomplished by a variety of methods including, but not limited to, filtration, driers using molecular sieves, distillation, vapor space purging, and the like.
4. Attach a transfer line from the blend container to a supply container of HFO-1234yf
5. Transfer by weighing 311 g HFO-1234yf into the blend container.
6. Thoroughly mix the components in the blend container by rolling or other means for ~1 hour.
7. Obtain a sample of the liquid phase of the refrigerant from the blend container and analyze by GC to confirm that the measured composition of the prepared R-454B is within specification and tolerances.
8. It may be necessary to add one or more of the individual components to the prepared mixture in the blend container to bring the total composition within specification.

Example 10. Process for Preparing R-454C Using Recycled HFC-32

1 kg of R-454C is prepared using 21.5% recycled/reclaimed HFC content and will exhibit a >99% lower "effective" GWP when prepared using reclaimed and/or recycled R-32, according to an exemplary procedure described below:

1. Prepare a refrigerant container by cleaning, drying, and evacuating a blend container
2. Attach a transfer line from the blend container, to a supply container of recovered HFC-32
3. Transfer by weighing 215 g recovered HFC-32 into the blend container.
   a. The recovered HFC-32 can be obtained by removing used HFC-32 from a refrigeration apparatus or system (e.g., an appliance, automotive, or any other refrigeration, air conditioning, or heat pump system);
   b. Impurities in the recovered HFC-32 purity must be removed from the recovered HFC-32 prior to using it to prepare a new refrigerant blend, including, but not limited to rust, oil(s), dirt, water, air, other non-condensable gases, and the like.
   c. Removal of impurities can be accomplished by a variety of methods including, but not limited to, filtration, driers using molecular sieves, distillation, vapor space purging, and the like.
4. Attach a transfer line from the blend container to a supply container of HFO-1234yf.

5. Transfer by weighing 785 g HFO-1234yf into the blend container.
6. Thoroughly mix the components in the blend container by rolling or other means for ~1 hour.
7. Obtain a sample of the liquid phase of the refrigerant from the blend container and analyze by GC to confirm that the measured composition of the prepared R-454C is within specification and tolerances.
8. It may be necessary to add one or more of the individual components to the prepared mixture in the blend container to bring the total composition within specification.

Other Embodiments

1. In some embodiments, the present application provides a process of preparing a refrigerant blend comprising one or more purified hydrofluorocarbon compounds, comprising:
   (a) recovering the one or more hydrofluorocarbons from one or more refrigeration, air conditioning, or heat pump systems;
   (b) purifying the one or more hydrofluorocarbon compounds to form one or more purified hydrofluorocarbon compounds; and
   (c) blending the one or more purified hydrofluorocarbon compounds with one or more hydrofluoroolefins having a global warming potential of less than about 20 to form the refrigerant blend;
   wherein the one or more hydrofluorocarbon compounds are selected from difluoromethane (R-32), pentafluoroethane (R-125), 1,1,1,2-tetrafluoroethane (R-134a), 1,1-difluoroethane (HFC-152a), 1,1,2,2-tetrafluoroethane (HFC-134), and 1,1,1,2,3,3,3-heptafluoropropane (HFC-227ea), or any mixture thereof.
2. The process of embodiment 1, wherein each of the one or more hydrofluoroolefins has an effective global warming potential of less than about 10.
3. The process of embodiment 1, wherein each of the one or more hydrofluoroolefins has an effective global warming potential of less than about 2.
4. The process of embodiment 1, wherein each of the one or more hydrofluoroolefins has an effective global warming potential of less than about 1.
5. The process of any one of embodiments 1 to 4, wherein step (b) is performed one or more times prior to the mixing of step (c).
6. The process of any one of embodiments 1 to 5, further comprising:
   (d) reclaiming the one or more hydrofluoroolefins from one or more refrigeration, air conditioning or heat pump systems; and
   (e) purifying the one or more hydrofluoroolefins to form one or more purified hydrofluoroolefins.
7. The process of embodiment 6, wherein steps (d) and (e) are each performed prior to the blending of step c).
8. The process of any one of embodiments 1 to 7, wherein each of the one or more purified hydrofluorocarbon or purified hydrofluoroolefin compounds has an effective global warming potential of about 0.
9. The process of any one of embodiments 1 to 8, wherein the one or more hydrofluoroolefins are selected from the group consisting of (Z)-1,1,1,4,4,4-hexafluorobut-2-ene (HFO-1336mzz-(Z)), (E)-1,1,1,4,4,4-hexafluorobut-2-ene (HFO-1336mzz-(E)), 2,3,3,3-tetrafluoropropene (HFO-1234yf), (E)-1,3,3,3-tetrafluoropropene (HFO-1234ze-(E)), trifluoroethylene (HFO-1123), (E)-1,2,3,3,3-pentafluoropropene (HFO-1225ye-(E), and 3,3,3-trifluoropropene (HFO-1243zf), or any mixture thereof.

10. The process of any one of embodiments 1 to 9, wherein the hydrofluorocarbon compound is difluoromethane (R-32).

11. The process of any one of embodiments 1 to 10, wherein the hydrofluoroolefin is 2,3,3,3-tetrafluoropropene (HFO-1234yf).

12. The process of any one of embodiments 1 to 11, wherein the refrigerant blend comprises:

about 21 to about 22 weight percent purified difluoromethane (R-32); and about 78 to about 79 weight percent 2,3,3,3-tetrafluoropropene (HFO-1234yf).

13. The process of any one of embodiments 1 to 11, wherein the refrigerant blend comprises:

about 68 to about 69 weight percent purified difluoromethane (R-32); and about 30 to about 31 weight percent 2,3,3,3-tetrafluoropropene (HFO-1234yf).

14. The process of any one of embodiments 1 to 11, wherein the refrigerant blend comprises:

about 34 to about 36 weight percent purified difluoromethane (R-32); and about 64 to about 66 weight percent 2,3,3,3-tetrafluoropropene (HFO-1234yf).

15. The process of any one of embodiments 1 to 9, wherein the hydrofluorocarbon is a mixture of difluoromethane (R-32) and pentafluoroethane (R-125).

16. The process of any one of embodiments 1 to 9 and 15, wherein the hydrofluoroolefin is 2,3,3,3-tetrafluoropropene (HFO-1234yf).

17. The process of any one of embodiments 1 to 9, 15, and 16, wherein the refrigerant blend comprises:

about 66 to about 68 weight percent purified difluoromethane (R-32);

about 6 to about 8 weight percent purified pentafluoroethane (R-125); and about 25 to about 27 weight percent 2,3,3,3-tetrafluoropropene (HFO-1234yf).

18. The process of any one of embodiments 1 to 9, wherein one or more hydrofluorocarbon compounds is a mixture of difluoromethane (R-32), pentafluoroethane (R-125), and 1,1,1,2-tetrafluoroethane (R-134a).

19. The process of any one of embodiments 1 to 9, and 18, wherein the hydrofluoroolefin is 2,3,3,3-tetrafluoropropene (HFO-1234yf).

20. The process of any one of embodiments 1 to 9, 18, and 19 wherein the refrigerant blend comprises:

about 24 to about 25 weight percent purified difluoromethane (R-32);

about 24 to about 25 weight percent purified pentafluoroethane (R-125);

about 25 to about 26 weight percent purified 1,1,1,2-tetrafluoroethane (R-134a); and about 25 to about 26 weight percent 2,3,3,3-tetrafluoropropene (HFO-1234yf).

21. The process of any one of embodiments 1 to 9, wherein the hydrofluorocarbon compound is 1,1,1,2-tetrafluoroethane (R-134a).

22. The process of any one of embodiments 1 to 9, and 21, wherein the hydrofluorolefin is 2,3,3,3-tetrafluoropropene (HFO-1234yf).

23. The process of any one of embodiments 1 to 9, 21, and 22, wherein the refrigerant blend comprises:

about 43 to about 45 weight percent purified 1,1,1,2-tetrafluoroethane (R-134a); and about 55 to about 57 weight percent 2,3,3,3-tetrafluoropropene (HFO-1234yf).

24. The process of any one of embodiments 1 to 23, wherein the refrigeration system comprises an air conditioner, a freezer, a refrigerator, a chiller, a heat pump, a mobile refrigerator, a mobile air conditioning unit, an immersion cooling system, a data-center cooling system, or any combination thereof.

25. The process of embodiment 24, wherein the air conditioner is an automotive air conditioner.

26. The process of embodiment 24, wherein the heat pump is a high temperature heat pump.

27. The process of embodiment 24, wherein the chiller is a water chiller, a flooded evaporator chiller, a direct expansion chiller, a screw chiller, a scroll chiller, or a centrifugal chiller.

28. The process of embodiment 24, wherein the refrigerator is a walk-in refrigerator.

29. The process of embodiment 24, wherein the freezer is a walk-in freezer.

30. The process of any one of embodiments 1 to 29, wherein the purifying of step (b) comprises removing solid impurities from the one or more hydrofluorocarbon compounds.

31. The process of any one of embodiments 1 to 30, wherein the solid impurities are removed by one or more purification techniques selected from pressure filtration, vacuum filtration, membrane centrifugal filtration, gravity filtration, depth filter filtration, granular bed filtration, cartridge filtration using carbon, fiber or metal filtration, and precoat filtration.

32. The process of any one of embodiments 1 to 31, wherein the purifying of step (b) comprises removing liquid impurities, gaseous impurities, or a combination thereof, from the one or more hydrofluorocarbon compounds.

33. The process of any one of embodiments 1 to 32, wherein the liquid impurities, gaseous impurities, or a combination thereof are removed by one or more purification techniques selected from distillation, decantation, contact with molecular sieves, and vapor space purging.

34. The process of any one of embodiments 7 to 33, wherein the purifying of step (e) comprises removing solid impurities from the one or more hydrofluoroolefins.

35. The process of embodiment 34, wherein the solid impurities are removed by one or more purification techniques selected from pressure filtration, vacuum filtration, membrane centrifugal filtration, gravity filtration, depth filter filtration, granular bed filtration, cartridge filtration using carbon, fiber or metal filtration, and precoat filtration.

36. The process of any one of embodiments 7 to 35, wherein the purifying of step (e) comprises removing liquid impurities, gaseous impurities, or a combination thereof, from the one or more hydrofluoroolefins.

37. The process of embodiment 36, wherein the liquid impurities, gaseous impurities, or a combination thereof are removed by one or more purification techniques selected from distillation, decantation, contact with molecular sieves, and vapor space purging.

38. In some embodiments, the present application further provides a process of reducing the global warming potential of a refrigerant blend, comprising:

(a) selecting one or more hydrofluorocarbons recovered from one or more refrigeration, air conditioning or heat pump systems;

(b) purifying the one or more hydrofluorocarbon compounds to form one or more purified hydrofluorocarbon compounds; and (c) blending the one or more purified hydrofluorocarbon compounds with one or more hydrofluoroolefins having a global warming potential of less than about 20 to form a purified refrigerant blend;

wherein the purified refrigerant blend has a reduced global warming potential compared to a refrigerant blend comprising the one or more hydrofluoroolefins and one or more hydrofluorocarbon compounds which have not been recovered and purified according to steps (b)-(c);

wherein the one or more hydrofluorocarbon compounds are selected from difluoromethane (R-32), pentafluoroethane (R-125), 1,1,1,2-tetrafluoroethane (R-134a), 1,1-difluoroethane (HFC-152a), 1,1,2,2-tetrafluoroethane (HFC-134), and 1,1,1,2,3,3,3-heptafluoropropane (HFC-227ea).

39. The process of embodiment 38, wherein the one or more hydrofluoroolefins are selected from the group consisting of (Z)-1,1,1,4,4,4-hexafluorobut-2-ene (HFO-1336mzz-(Z)), (E)-1,1,1,4,4,4-hexafluorobut-2-ene (HFO-1336mzz-(E)), 2,3,3,3-tetrafluoropropene (HFO-1234yf), (E)-1,3,3,3-tetrafluoropropene (HFO-1234ze-(E)), trifluoroethylene (HFO-1123), (E)-1,2,3,3,3-pentafluoropropene (HFO-1225ye-(E), and 3,3,3-trifluoropropene (HFO-1243zf), or any mixture thereof.

40. The process of embodiment 38 or 39, wherein the refrigerant blend has an effective global warming potential which is about 10% or less compared to a refrigerant blend comprising the one or more hydrofluoroolefins and one or more hydrofluorocarbon compounds which have not been recovered and purified according to steps (b)-(c).

41. The process of embodiment 38 or 39, wherein the purified refrigerant blend has an effective global warming potential which is about 5% or less compared to a refrigerant blend comprising the one or more hydrofluoroolefins and one or more hydrofluorocarbon compounds which have not been recovered and purified according to steps (b)-(c).

42. The process of embodiment 38 or 39, wherein the refrigerant blend has an effective global warming potential which is about 1% or less compared to a refrigerant blend comprising the one or more hydrofluoroolefins and one or more hydrofluorocarbon compounds which have not been recovered and purified according to steps (b)-(c).

43. A refrigeration, air conditioning or heat pump system, comprising a refrigerant blend prepared according to the process of any one of embodiments 1 to 42.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

What is claimed is:

1. A process of preparing a refrigerant blend of R-449A comprising recovered R-407A or R-410A, comprising:

(a) recovering a blend selected from the group consisting of R-407A or R-410A from one or more refrigeration systems;

(b) purifying the R-407A or R-410A to form purified R-407A or R-410A, wherein the purifying of step (b) comprises removing solid impurities from the R-407A or R-410A, and wherein the solid impurities are removed by one or more purification techniques selected from vacuum filtration, membrane centrifugal filtration, gravity filtration, depth filter filtration, granular bed filtration, cartridge filtration using carbon, fiber or metal filtration, and precoat filtration;

(c) blending the purified R-407A or R-410A with 2,3,3,3-tetrafluoropropene (HFO-1234yf) to form the refrigerant blend;

(d) recovering 2,3,3,3-tetrafluoropropene (HFO-1234yf) from one or more refrigeration, air conditioning or heat pump systems;

(e) purifying the 2,3,3,3-tetrafluoropropene (HFO-1234yf) to form purified 2,3,3,3-tetrafluoropropene (HFO-1234yf); and (f) optionally adding one or more components of R-449A after step (c) to bring the refrigerant blend into specification;

wherein steps (d) and (e) are each performed prior to the blending of step (c);

wherein the purifying of step (e) comprises removing liquid impurities, gaseous impurities, or a combination thereof, from the 2,3,3,3-tetrafluoropropene (HFO-1234yf), wherein the liquid impurities, gaseous impurities, or a combination thereof are removed by one or more purification techniques selected from distillation, decantation, contact with molecular sieves, and vapor space purging.

2. The process of claim 1, wherein step (b) is performed one or more times prior to the mixing of step (c).

3. The process of claim 1, wherein the refrigeration system comprises an air conditioner, a freezer, a refrigerator, a chiller, a heat pump, a mobile refrigerator, a mobile air conditioning unit, an immersion cooling system, a datacenter cooling system, or any combination thereof.

4. The process of claim 1, wherein the purifying of step (b) comprises removing liquid impurities, gaseous impurities, or a combination thereof, from the R-407A or R-410A.

5. The process of claim 4, wherein the liquid impurities, gaseous impurities, or a combination thereof are removed by one or more purification techniques selected from distillation, decantation, contact with molecular sieves, and vapor space purging.

6. The process of claim 1, wherein the purifying of step (e) further comprises removing solid impurities from the 2,3,3,3-tetrafluoropropene (HFO-1234yf).

7. The process of claim 6, wherein the solid impurities are removed by one or more purification techniques selected from vacuum filtration, membrane centrifugal filtration, gravity filtration, depth filter filtration, granular bed filtration, cartridge filtration using carbon, fiber or metal filtration, and precoat filtration.

8. The process of claim 1, wherein the recovered blend is R-410A, and wherein the purified R-410A is blended with HFC-134a and the purified HFO-1234yf.

9. The process of claim 8, further comprising recovering HFC-134a from one or more refrigeration, air conditioning or heat pump systems, and purifying the HFC-134a to form purified HFC-134a, wherein the purified HFC-134a is blended with the purified R-410A and the purified HFO-1234yf.

10. A process of reducing the global warming potential of a refrigerant blend of R-449A, comprising:

(a) selecting R-407A or R-410A recovered from one or more refrigeration systems;

(b) purifying the R-407A or R-410A to form purified R-407A or R-410A, wherein the purifying of step (b) comprises removing solid impurities from the R-407A or R-410, and wherein the solid impurities are removed by one or more purification techniques selected from vacuum filtration, membrane centrifugal filtration, gravity filtration, depth filter filtration, granular bed filtration, cartridge filtration using carbon, fiber or metal filtration, and precoat filtration;

(c) blending the purified R-407A or R-410 with 2,3,3,3-tetrafluoropropene (HFO-1234yf) to form a purified refrigerant blend;

d) recovering the 2,3,3,3-tetrafluoropropene (HFO-1234yf) from one or more refrigeration, air conditioning or heat pump systems;

(e) purifying the 2,3,3,3-tetrafluoropropene (HFO-1234yf) to form purified 2,3,3,3-tetrafluoropropene (HFO-1234yf); and (f) optionally adding one or more components of R-449A after step (c) to bring the refrigerant blend into specification;

wherein steps (d) and (e) are each performed prior to the blending of step (c);

wherein the purified R-449A refrigerant blend has a reduced global warming potential compared to a refrigerant blend comprising components which have not been recovered and purified according to steps (b)-(c);

wherein the purifying of step (e) comprises removing liquid impurities, gaseous impurities, or a combination thereof, from the one or more hydrofluoroolefins, wherein the liquid impurities, gaseous impurities, or a combination thereof are removed by one or more purification techniques selected from distillation, decantation, contact with molecular sieves, and vapor space purging.

\*   \*   \*   \*   \*